United States Patent
Oakley

(10) Patent No.: US 9,397,604 B2
(45) Date of Patent: Jul. 19, 2016

(54) MOTOR CONTROL DEVICES AND METHODS

(71) Applicant: HONDA MOTOR CO., LTD., Tokyo (JP)

(72) Inventor: Michael D. Oakley, Plain City, OH (US)

(73) Assignee: Honda Motor Co., Ltd., Tokyo (JP)

(*) Notice: Subject to any disclaimer, the term of this patent is extended or adjusted under 35 U.S.C. 154(b) by 86 days.

(21) Appl. No.: 14/213,862

(22) Filed: Mar. 14, 2014

(65) Prior Publication Data

US 2014/0265949 A1    Sep. 18, 2014

Related U.S. Application Data

(60) Provisional application No. 61/788,910, filed on Mar. 15, 2013.

(51) Int. Cl.
   *H02P 1/00* (2006.01)
   *H02P 29/00* (2016.01)

(52) U.S. Cl.
   CPC ........ *H02P 29/0055* (2013.01); *H02P 29/0044* (2013.01)

(58) Field of Classification Search
   CPC ............. H02P 4/00; H02P 29/02; H02P 7/28; H02P 7/0854; H02P 7/093
   USPC .................... 318/139, 140, 145, 146, 400.34, 318/400.38, 434; 180/170, 174, 65.1, 180/65.21, 65.285, 65.29
   See application file for complete search history.

(56) References Cited

U.S. PATENT DOCUMENTS

| 4,476,423 A | 10/1984 | Mallick, Jr. et al. |
| 4,547,826 A | 10/1985 | Premerlani |
| 4,616,324 A | 10/1986 | Simmel |
| 4,641,067 A | 2/1987 | Iizawa et al. |
| 4,939,437 A | 7/1990 | Farag et al. |
| 5,168,415 A | 12/1992 | Osuga |
| 5,305,234 A | 4/1994 | Markus et al. |
| 5,569,995 A * | 10/1996 | Kusaka ............... B60L 11/1807 318/717 |
| 5,619,107 A * | 4/1997 | Shinohara ................. B60L 3/00 307/10.7 |
| 5,627,710 A | 5/1997 | Schoeffler |
| 5,644,510 A | 7/1997 | Weir |
| 5,682,090 A | 10/1997 | Shigematsu et al. |

(Continued)

FOREIGN PATENT DOCUMENTS

| EP | 0596472 A2 | 5/1994 |
| EP | 0999630 A1 | 5/2000 |

(Continued)

*Primary Examiner* — Bentsu Ro
*Assistant Examiner* — Thai Dinh
(74) *Attorney, Agent, or Firm* — Arent Fox LLP

(57) ABSTRACT

A system and method for preventing damage to a controller of an electric motor in a vehicle from back electromotive force, the vehicle having a battery, includes monitoring, in a circuit path, a voltage and a rotational speed generated by back-driving the motor. If power is supplied to the controller by the battery, the method includes comparing the voltage to an upper voltage threshold, comparing the rotational speed to an upper rotational speed threshold, and, if the voltage exceeds the upper voltage threshold or the rotational speed exceeds the upper rotational speed threshold, clamping the circuit path to the battery to charge the battery with the voltage. The method is performed by an electronic controller that may detect the voltage and rotational speed via controller ports, sensor transmissions, and the like.

17 Claims, 21 Drawing Sheets

(56) References Cited

U.S. PATENT DOCUMENTS

| | | | |
|---|---|---|---|
| 5,772,274 A | 6/1998 | Tokarz | |
| 5,780,980 A * | 7/1998 | Naito | B60K 6/28 307/19 |
| 5,801,502 A | 9/1998 | Monzen | |
| 6,066,931 A | 5/2000 | Morris et al. | |
| 6,318,487 B2 * | 11/2001 | Yanase | 180/65.245 |
| 6,363,315 B1 | 3/2002 | Love et al. | |
| 6,694,232 B2 * | 2/2004 | Saito | B60K 6/485 180/65.1 |
| 6,701,221 B1 | 3/2004 | Eaton et al. | |
| 6,861,820 B2 | 3/2005 | Gale et al. | |
| 6,897,782 B2 | 5/2005 | Heinrich et al. | |
| 7,064,505 B2 | 6/2006 | Sato | |
| 7,282,881 B2 | 10/2007 | Kay | |
| 7,463,463 B2 | 12/2008 | Kobayashi et al. | |
| 7,564,662 B2 | 7/2009 | Zhang et al. | |
| 7,573,222 B2 | 8/2009 | Sumiya et al. | |
| 7,586,286 B2 | 9/2009 | Cheng et al. | |
| 7,675,720 B1 | 3/2010 | Zoeholl et al. | |
| 7,791,299 B2 | 9/2010 | Eichin | |
| 8,234,817 B2 | 8/2012 | Neundorf et al. | |
| 8,355,845 B2 | 1/2013 | Kalb | |
| 8,358,095 B2 | 1/2013 | Savagian et al. | |
| 2007/0132421 A1 | 6/2007 | Iwashita et al. | |
| 2008/0258663 A1 | 10/2008 | Walls | |
| 2011/0270558 A1 | 11/2011 | Knezevic et al. | |
| 2012/0013143 A1 | 1/2012 | Schiegel | |
| 2012/0309588 A1 * | 12/2012 | Ashida | B60L 3/04 477/7 |

FOREIGN PATENT DOCUMENTS

| | | |
|---|---|---|
| EP | 2308737 A1 | 4/2011 |
| WO | 9323904 | 11/1993 |
| WO | 2013015791 A1 | 1/2013 |

* cited by examiner

MOTOR CONTROL DEVICES AND METHODS

CROSS REFERENCE TO RELATED APPLICATION

This application is a non-provisional and claims the benefit of U.S. Pat. Ser. No. 61/788,910, filed Mar. 15, 2013, and incorporated herein by reference.

STATEMENT REGARDING FEDERALLY SPONSORED RESEARCH

Not applicable.

BACKGROUND OF THE INVENTION

The present invention generally relates to motor control devices and methods, and more particularly to motor control devices and methods that are applicable with electric motors used in automotive powered device applications.

Electrically energized motors are used in a wide variety of applications. For instance, various automotive applications incorporate a motor for actuation of an attached device, such as powered doors, hatches, and liftgates. The operation and control of these powered devices has become increasingly sophisticated, while at the same time economic and packaging constraints continue to present additional challenges. In particular, it would be advantageous to replace structural control mechanisms, such as clutches and positive temperature coefficient (PTC) thermal breakers, with electronic control mechanisms that can be applied without consuming valuable space within or near the motor housing.

In light of at least the above design considerations and the challenges presented by them, a need exists for improved motor control devices and methods capable of use in automotive applications.

SUMMARY OF THE INVENTION

In one aspect, methods and devices manage power generated by mechanical rotation of an electric motor in an automotive application.

In another aspect, methods and devices determine and regulate the heat generated by an electric motor.

In a further aspect, methods and devices determine and verify the thermal characteristics of an electric motor during electric and manual operation.

In yet another aspect, methods and devices operate and control an electric motor after a temperature threshold has been exceeded.

In another aspect, methods and devices monitor manual operation of an electric motor in connection with thermal protection of the motor.

In a further aspect, methods and devices address thermal protection of an electric motor when available data is insufficient.

In yet a further aspect, a hinge arm device and method of manufacture incorporate overlapping flanges that are bonded.

In one aspect, the present disclosure provides a method of managing power generation of an electric motor that is in electrical communication with a controller. The method includes monitoring a rotational speed of a drive shaft of the electric motor, comparing the rotational speed to an upper rotational speed threshold, and limiting a voltage on a circuit path between the electric motor and the controller when the rotational speed is greater than the upper rotational speed threshold. The voltage being generated by the electric motor. Limiting the voltage on the circuit path may include electrically connecting a battery to the circuit path such that the voltage on the circuit path is limited to a battery voltage of the battery. Electrically connecting the battery to the circuit path may include clamping the circuit path to the battery such that an excess voltage above the battery voltage is transferred from the electric motor to the battery.

The method may further include monitoring the voltage on the circuit path, comparing the voltage to an upper voltage threshold, and limiting the voltage when the voltage is greater than the upper voltage threshold. Monitoring the rotational speed may include receiving the rotational speed from a hall sensor configured to detect the rotational speed of the drive shaft. Monitoring the voltage on the circuit path may include detecting the voltage across a plurality of power lines electrically connecting the controller to the electric motor. Electrically connecting the battery to the circuit path may include closing a relay between the circuit path and the battery.

The method may further include detecting that the electric motor has stopped generating an excess voltage and, if the battery is electrically connected to the circuit path, disconnecting the battery from the circuit path when the electric motor has stopped generating the excess voltage. The method may further include detecting that the rotational speed is below a lower rotational speed threshold and, if the battery is electrically connected to the circuit path, disconnecting the battery from the circuit path when the electric motor has stopped generating the excess voltage and/or the rotational speed is below the lower rotational speed threshold. The method may further include determining whether the controller is in electrical communication with the battery and, if the controller is not in electrical communication with the battery, interrupting the electrical communication between the controller and the electric motor.

In another aspect, the present disclosure provides a method for preventing damage to a controller of an electric motor in a vehicle having a battery from back electromotive force. The method may include monitoring, in a circuit path, a voltage and a rotational speed generated by back-driving the motor and detecting whether power is supplied to the controller by the battery. If the controller is not powered by the battery, the method includes breaking the circuit path between the controller and the motor. Breaking the circuit path between the controller and the motor may include maintaining a harness relay of the vehicle in an open position, the harness relay controlling a power line between the controller and the motor. If the controller is powered by the battery, the method may include comparing the voltage to an upper voltage threshold, comparing the rotational speed to an upper rotational speed threshold, and, if the voltage exceeds the upper voltage threshold or the rotational speed exceeds the upper rotational speed threshold, clamping the circuit path to the battery to charge the battery with the voltage. The upper voltage threshold may be 18 volts.

The method may further include detecting that the motor has stopped generating an excess voltage and, if the circuit path is clamped to the battery, disconnecting the battery from the circuit path when the electric motor has stopped generating the excess voltage. The method may further include detecting that the rotational speed is below a lower rotational speed threshold and, if the circuit path is clamped to the battery, disconnecting the battery from the circuit path when the motor has stopped generating the excess voltage and/or the rotational speed is below the lower rotational speed threshold.

In another aspect, the present disclosure provides a device for controlling an electric motor in a vehicle, the vehicle having a circuit path between a battery of the vehicle and the electric motor. The device may include at least one controller in electrical communication with the circuit path, a harness relay disposed in electrical communication with the circuit path and configured to break or complete the circuit path between the electric motor and the controller, and a main relay disposed in electrical communication with the circuit path and configured to break or complete the circuit path between the electric motor and the battery. The controller may be configured to close the harness relay to complete the circuit path between the electric motor and the controller when the electric motor is being back-driven, detect when a voltage generated by back-driving the motor exceeds an upper voltage threshold, detect when a rotational speed generated by back-driving the motor exceeds an upper rotational speed threshold, and, upon detection of the voltage exceeding the upper voltage threshold or the rotational speed exceeding the rotational speed threshold, cause the main relay to close, completing the circuit path from the electric motor to the battery to charge the battery with the voltage. The controller may be further configured to detect whether the controller is powered by the battery and, if the controller is not powered by the battery, maintain the harness relay in an open position to break the circuit path between the electric motor and the controller. The controller may be further configured to detect that the voltage is no longer above the upper voltage threshold, detect that the rotational speed is below a lower rotational speed threshold, and open the main relay when the voltage is below the upper voltage threshold and the rotational speed is below a lower rotational speed threshold.

In another aspect, the present disclosure provides a method for preventing thermal damage to an electric motor in a vehicle. The method may include monitoring the motor, detecting a cycle of the motor, and: if the cycle occurred within a predetermined increment time, incrementing a cycle count; if no cycle occurs for a predetermined decrement time, decrementing the cycle count if the cycle count is greater than zero; and, if the cycle count is at least equal to a cycle limit, deactivating power operation of the motor for at least the decrement time. The method may further include detecting an ambient temperature of the vehicle and decreasing the cycle limit if the ambient temperature exceeds one or more ambient temperature thresholds. The method may further include increasing the decrement time if the ambient temperature exceeds one or more of the ambient temperature thresholds.

The method may further include continuously calculating energy consumed by the motor as the motor is monitored. If the energy consumed exceeds one or more allowable energy thresholds, the method may include setting the cycle count equal to the cycle limit. Calculating the energy consumed may include measuring and integrating an electrical current consumed by the motor. Calculating the energy consumed may include setting a first limit of integration and a second limit of integration larger than the first limit of integration, setting a first of the allowable energy thresholds as a short period threshold and a second of the allowable energy thresholds as a long period threshold, measuring and integrating, within the first limit of integration, an electrical current consumed by the motor, measuring and integrating the electrical current within the second limit of integration, and, if the energy consumed within the first limit of integration exceeds the short period threshold or the energy consumed within the second limit of integration exceeds the long period threshold, setting the cycle count equal to the cycle count limit. The method may further include detecting an ambient temperature of the vehicle and decreasing one or more of the allowable energy thresholds if the ambient temperature exceeds one or more ambient temperature thresholds. The method may further include detecting a failure condition and setting the cycle count equal to the cycle limit when the failure condition is detected.

The method may further include determining the one or more allowable energy thresholds. Determining the one or more allowable energy thresholds may include characterizing a power operation mode and characterizing a manual operation mode. Characterizing the power operation mode may include identifying a worst case condition of operating the motor, monitoring an internal temperature of the motor, operating the motor in the worst case condition until the internal temperature reaches a desired temperature limit, and calculating the energy consumed by the motor for the internal temperature to reach the temperature limit.

The method may further include determining the cycle limit. Determining the cycle limit may include monitoring an internal temperature of the motor, operating the motor until the internal temperature reaches a desired temperature limit, and setting the cycle limit to the number of cycles needed for the internal temperature to reach the temperature limit.

The cycle may be included in the cycle count both when the cycle is a powered operation and when the cycle is a manual operation. The increment to the cycle count may be multiplied by a multiplier greater or less than 1 if the cycle is a manual operation. The method may further include, if the cycle count is at least equal to a maximum cycle count greater than the cycle limit, deactivating manual operation of the motor at least until the cycle count is less than the cycle limit.

In another aspect the present disclosure provides a device for preventing thermal damage to a clutchless electric motor in a vehicle. The device may include an electronic control unit in electrical communication with the motor and configured to monitor operations of the motor, maintain a cycle count and a cycle limit each representing a number of cycles of the motor, increment the cycle count if a cycle is detected within a predetermined increment time, decrement the cycle count if the cycle count is greater than zero and no cycle occurs for a predetermined decrement time, and deactivate power operation of the motor for at least the decrement time if the cycle count is at least equal to the cycle limit. The device may include a non-volatile memory, and the electronic control unit may be further configured to store one or both of the cycle count and the cycle limit in the non-volatile memory, and, if power to the electronic control unit is interrupted, retrieve one or more of the cycle count and the cycle limit from the non-volatile memory when power is restored. The electronic control unit may store the cycle count to memory each time the cycle count is incremented or decremented. The electronic control unit may include a capacitor having sufficient capacitance to allow the electronic control unit to store the cycle count to the non-volatile memory within a buffer time after power to the electronic control unit is interrupted. The electronic control unit may be configured to set the cycle count to the cycle limit when power is restored if the retrieved cycle count exceeds a fixed percentage of the cycle limit.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE EXAMPLE EMBODIMENTS

The concepts described below and shown in the accompanying figures are illustrative of example implementations of the inventive concepts; however, when given the benefit of this disclosure, one skilled in the art will appreciate that the inventive concepts described herein can be modified and incorporated into many other applications. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1A:
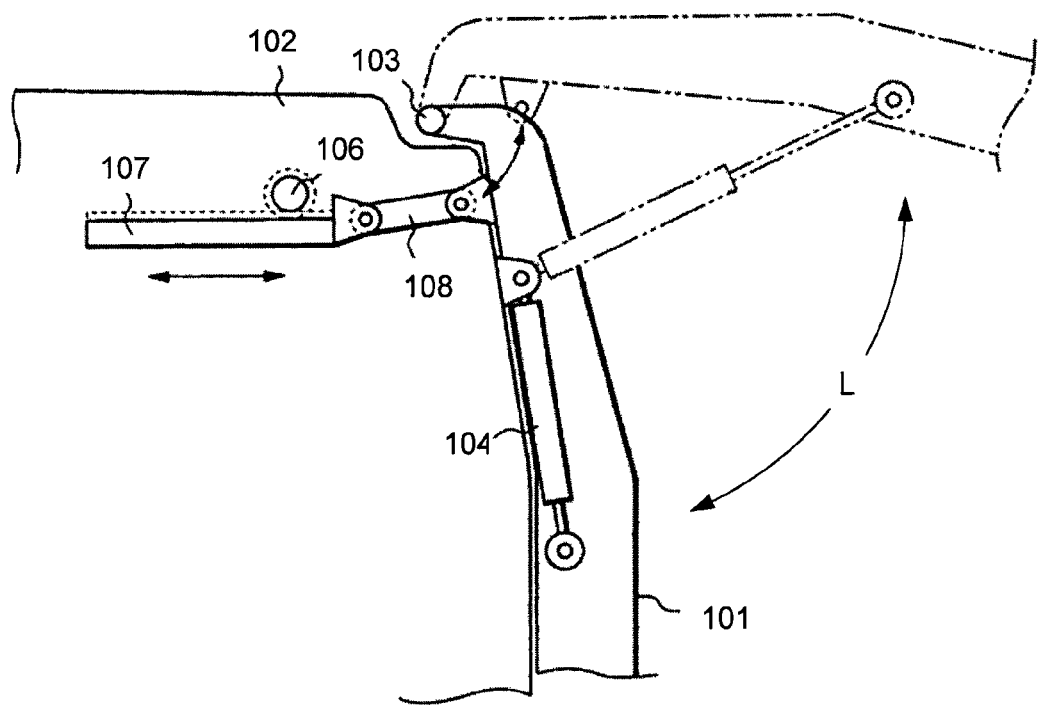
FIG. 1A is a side plan view of a power tailgate on a vehicle.
Figure 1B:
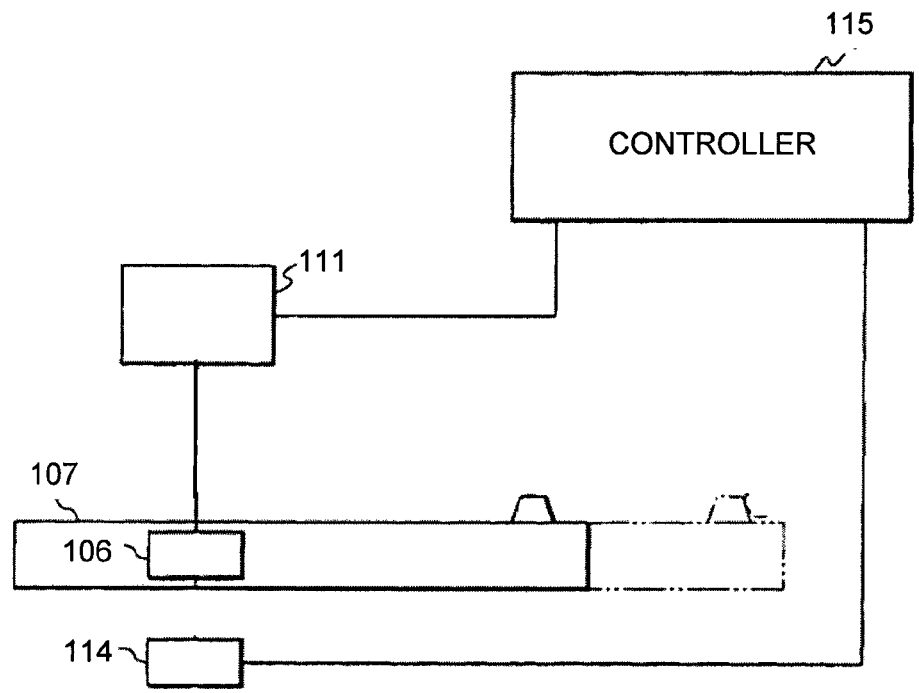
FIG. 1B is a diagram of an electric motor control system of the vehicle of FIG. 1A.

In particular, the concepts described below for controlling an electric motor and associated control electronics may be suitable for application to any electric motor. Specific arrangements are described below, wherein the motor operates a powered vehicle door between open and closed positions. FIGS. 1A and 1B illustrate an example vehicle 102 having a door 101, which may be a powered tailgate (PTG), operated by an electric motor 111 according to any suitable mechanical arrangement. In the illustrated example mechanical arrangement, the electric motor 111 rotates a pinion 106, and the rotational motion is transferred to linear motion of a rack 107 that intermeshes with the pinion 106. The rack 107 in turn moves a pivoting link 108 that is attached to the door 101 and causes the door 101 to swing open or closed around a hinge 103 (see line-of-motion L). A biasing member 104, such as a gas or hydraulic stay, may hold the door 101 in the open position or in any position between open and closed.

The motor 111 may be powered by a vehicle battery 114, which may be directly connected to the motor 111 in some embodiments, and in other embodiments may be connected to the motor 111 via one or more control circuits. Each control circuit may include a controller 115, which may be an electronic control unit (ECU) and other control electronics, such as microprocessors, voltage regulators, switches, integrated and non-integrated circuits, transistors, relays, control logic, volatile and non-volatile memory, and other electronic components suitable for performing the control algorithms in accordance with this disclosure. The algorithms are described as being performed by the controller 115, which is typically present in the circuit, but it will be understood that other electronic components of the control circuit may perform the algorithms.

Power Management of Back EMF Generated by an Electric Motor

Figure 2:
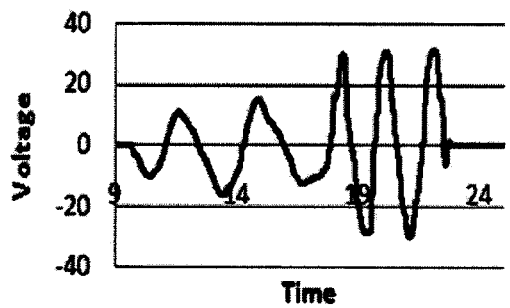
FIG. 2 is a chart depicting a voltage generated by mechanically driving the electric motor.

When electrical energy is applied to an electric motor, the motor typically electrically rotates a drive shaft to perform mechanical work. To the contrary, the drive shaft of the motor can be mechanically rotated, which causes the motor to become a generator producing electrical energy known as back electromagnetic force (back EMF). In some arrangements, such as those employed with electrically assisted or powered vehicle doors, hatches, or liftgates (e.g., a PTG), a clutch is typically employed to mechanically decouple the motor from the door during non-powered mechanical movement (e.g., manual opening or closing) of the door. Without a clutch, the motor is continuously coupled to the door and, as generally illustrated in FIG. 1, non-powered mechanical movement of the door 101 (along line L) rotates the drive shaft (not shown) of the motor 111 and generates a back EMF voltage (see FIG. 2) that has the potential to damage the controller's 115 sensitive components and other electronics that are in electrical communication with the motor 111.

Figure 3:
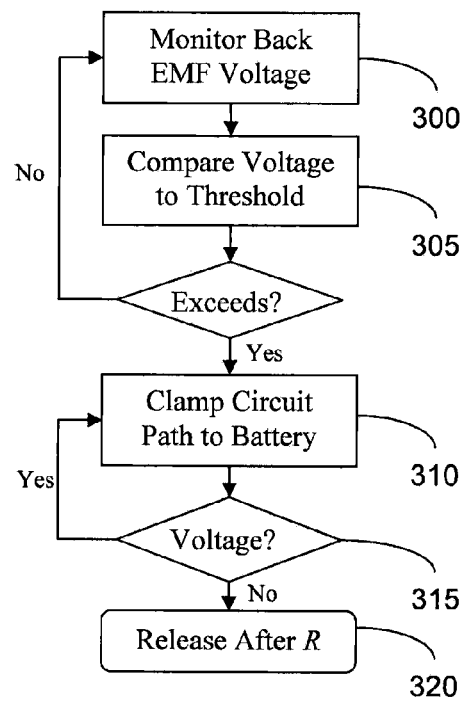
FIG. 3 is a flowchart of one embodiment of a method of managing back EMF voltage of the electric motor.
Figure 4:
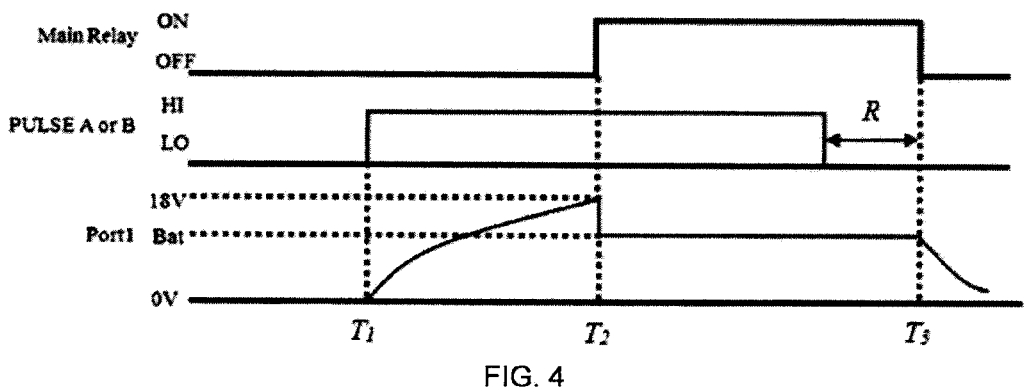
FIG. 4 is a timing diagram illustrating an application of the method of FIG. 3.

In accordance with the present disclosure, several methods and device configurations may be applied separately or in conjunction to address the problems associated with excessive back EMF caused by mechanical rotation of the electric motor 111. FIGS. 3 and 4 illustrate a first embodiment of a method performed by the controller 115 to electronically divert dangerously high back EMF voltage to the vehicle battery 114, thereby charging the battery and preventing the excessive voltage from entering and damaging any electronic components that are in a circuit path with the motor 111. At step 300, the controller 115 monitors the voltage generated by mechanically driving the motor 111. Monitoring the voltage may include detecting, at time $T_1$, the back EMF voltage on one or more wires or other conductive lines connected to the motor 111. In some embodiments, the controller 115 may detect the voltage directly, such as by sensing a voltage on an input port of the controller 115. In other embodiments, the controller 115 may detect another indicator that the motor is being mechanically driven, such as a signal from a motion sensor or hall effect sensor or from a suitable magnetic or electrical pulse detector. An example is illustrated in FIG. 4, wherein the controller 115 detects a pulse switching from a low (LO) to a high (HI) state at time $T_1$.

At step 305, the controller 115 may compare the monitored voltage to one or more voltage thresholds. If the controller 115 determines that the voltage is lower than a voltage threshold requiring action to attenuate it, referred to herein as an upper voltage threshold, the controller 115 continues monitoring the voltage. If the controller 115 determines that the voltage meets or exceeds the upper voltage threshold, at step 310 the controller 115 may clamp the circuit path to the battery 114. Clamping the circuit path may include activating one or more switches, such as a relay (labeled "Main Relay" in FIG. 4 and described further herein), to electrically connect the battery 114 to the circuit path. The effect is to divert the voltage in excess of the battery 114 voltage to the battery 114, which has the advantages of preventing excessive voltage on the electronic components, and charging the battery 114 with the excess voltage. The timing diagram of FIG. 4 illustrates that the controller 115 detects the voltage reaching an upper voltage threshold of 18 volts at time $T_2$, at which time the controller 115 activates the relay and the voltage in the circuit path drops to the battery 114 voltage of about 12 volts (see the curve labeled 'Port1'). Some embodiments may include circuit components, such as one or more capacitors and/or transistors, that allow the voltage to drop gradually to the battery 114 voltage more gradually than that shown in FIG. 4.

The controller 115 may continue to monitor the voltage as in step 300, or may continue to detect the pulse or other indicator that the motor 111 is being mechanically driven, at step 315. As long as the voltage is being generated, the controller 115 may maintain the clamp of the circuit path to the battery 114 (i.e., by keeping the relay activated). When the controller 115 detects that the motor has stopped generating an excess voltage, either by detecting a drop in the voltage or a change in the indicator (e.g., a detected pulse changing from HI to LO), at step 320 the controller 115 may deactivate the relay to unclamp the circuit path from the battery 114. In some embodiments, the controller 115 may unclamp the circuit path (e.g., at time $T_3$ of FIG. 4) after a release time R has passed, allowing the voltage to drop to a safe level (e.g., below the battery 114 voltage).

Figure 5:
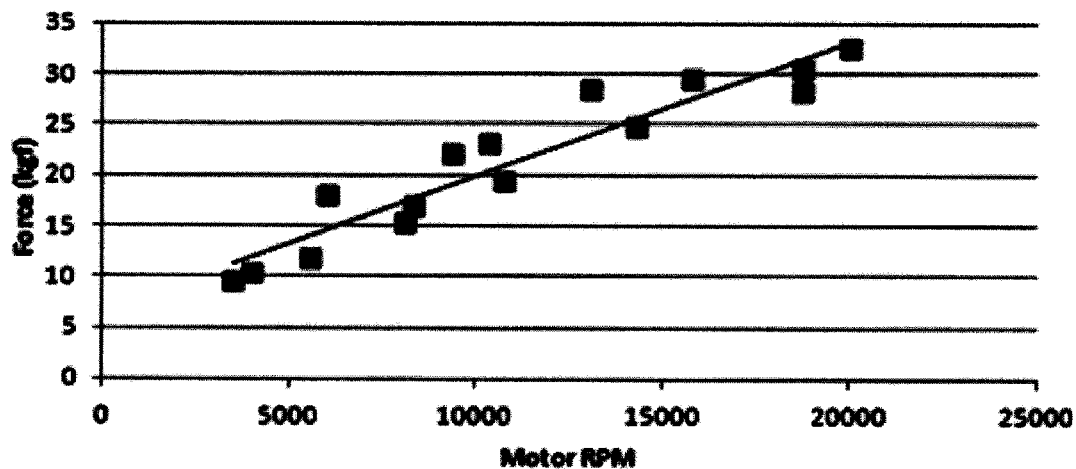
FIG. 5 is a chart depicting a correlation between a mechanical driving force and revolutions-per-minute of the electric motor.

In another embodiment of diverting the excess back EMF voltage, the controller 115 may be configured to clamp the circuit path to the battery at a fast rotational motor speed condition when the rotational speed of the motor (e.g., a motor drive shaft coupled to the device) equals or exceeds an upper rotational speed threshold. Referring to FIG. 5, the force (illustrated on the vertical axis in units of kilogram-force) with which the motor 111 is be mechanically driven correlates to the rotational speed (illustrated on the horizontal axis in units of revolutions per minute) of the motor. The rotational speed in turn correlates to the generated back EMF voltage; under high rotational speeds, large and potentially damaging voltages are generated. In an example correlative test, the results of which are shown in FIG. 5, collected data points (indicated by squares) show a linear correlation of force to RPM.

Figure 6:
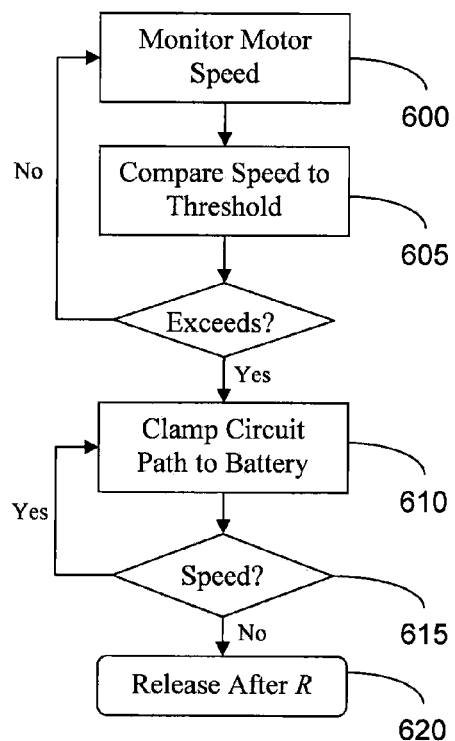
FIG. 6 is a flowchart of another embodiment of a method of managing back EMF voltage of the electric motor.
Figure 7:
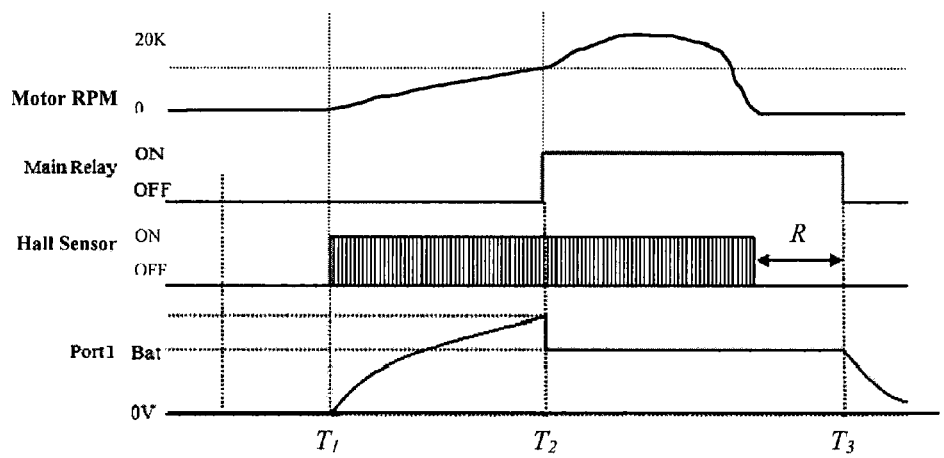
FIG. 7 is a timing diagram illustrating an application of the method of FIG. 6.

FIGS. 6 and 7 illustrate an embodiment of a method performed by the controller 115 to electronically divert dangerously high back EMF voltage to the vehicle battery 114, thereby charging the battery and preventing the excessive voltage from entering and damaging any electronic components that are in a circuit path with the motor 111. At step 600, the controller 115 monitors the speed of the motor 111 as it is mechanically driven. Monitoring the speed may include detecting, at time $T_1$, that the motor 111 shaft, stator, or other component is rotating. In some embodiments, a sensor, such as a hall sensor, may detect the rotation and rate of rotation of the motor 111 and may deliver a signal to the controller 115, the signal describing the detected characteristics. An example is illustrated in FIG. 7, wherein the controller 115 detects that a hall sensor has activated at time $T_1$, and the controller 115 receives the speed of the motor 111 from the hall sensor.

At step 605, the controller 115 may compare the monitored speed to one or more speed thresholds. If the controller 115 determines that the speed is lower than a speed threshold requiring action to attenuate the correlated voltage, referred to herein as an upper speed threshold, the controller 115 continues monitoring the speed. If the controller 115 determines that the speed meets or exceeds the upper speed threshold, at step 610 the controller 115 may clamp the circuit path to the battery 114. Clamping the circuit path may include activating one or more switches, such as a relay (labeled "Main Relay" in FIG. 7 and described further herein), to electrically connect the battery 114 to the circuit path. The effect is to divert the voltage in excess of the battery 114 voltage to the battery 114, which has the advantages of preventing excessive voltage on the electronic components, and charging the battery 114 with the excess voltage. The timing diagram of FIG. 7 illustrates that the controller 115 detects the speed reaching an upper speed threshold at time $T_2$, at which time the controller 115 activates the relay and the voltage in the circuit path drops to the battery 114 voltage of about 12 volts. Some embodiments may include circuit components, such as one or more capacitors and/or transistors, that allow the voltage to drop more gradually to the battery 114 voltage than as illustrated in FIG. 7.

The controller 115 may continue to monitor the speed as in step 600 by processing the data from the hall sensor or other indicator that the motor 111 is being mechanically driven, at step 615. As long as the speed is above a lower speed threshold, the controller 115 may maintain the clamp of the circuit path to the battery 114 (i.e., by keeping the relay activated). When the controller 115 detects that the motor has stopped or mostly stopped rotating, such as when the hall sensor deactivates or the lower speed threshold is reached, at step 620 the controller 115 may deactivate the relay to unclamp the circuit path from the battery 114. In some embodiments, the controller 115 may unclamp the circuit path (e.g., at time $T_3$ of FIG. 7) after a release time R (of about 500 ms) has passed, allowing the voltage to drop to a level below the battery 114 voltage).

Figure 8:
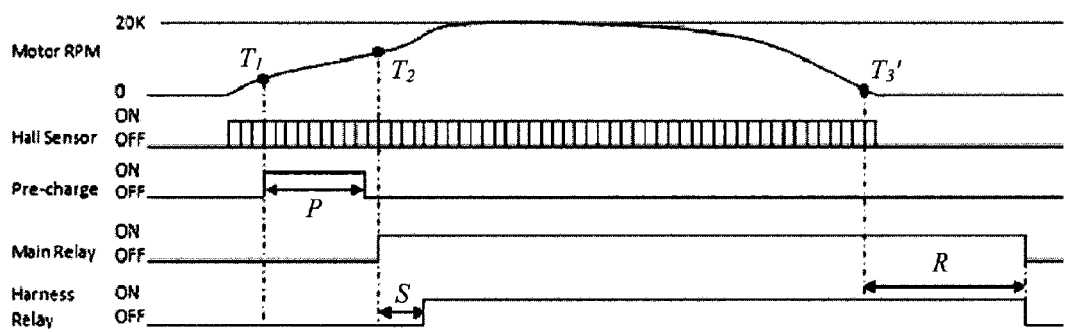
FIG. 8 is a timing diagram illustrating another application of the method of FIG. 6.

FIG. 8 illustrates another embodiment of clamping the circuit path to the battery 114 as in FIG. 6. According to the illustrated timing diagram, the controller 115 may first detect that the motor 111 is being manually or otherwise mechanically driven, at time $T_1$. At this time, the controller 115 may initiate a pre-charge of one or more capacitors in the circuit path, which has the advantage of minimizing stress on electronic components in a high-voltage situation when the back EMF voltage or battery 114 voltage is introduced into the circuit path. The pre-charge period P may be a suitable duration, such as 150 ms, to ensure that each capacitor is fully charged before any high-voltage relay is activated. The controller 115 then detects, at time $T_2$, the speed equaling or exceeding the upper speed threshold. In the illustrated embodiment, the controller 115 then activates two relays in sequence: first, the controller 115 activates the main relay connecting the battery 114 to the circuit path as described above; then, after a stabilizing period S of between zero and about 20 ms, the controller 115 may activate a second relay (labeled "Harness Relay") electrically connecting the motor 111 to the circuit path. Alternatively, the second relay may be activated before the main relay. When both relays are activated, the circuit path is clamped to the battery 114 and transfers back EMF voltage that exceeds the battery 114 voltage to the battery 114. The controller 115 may maintain the clamping until the speed is at the lower speed threshold (see time $T_3$'), at which time the controller 115 may deactivate one or both relays immediately or after a release time R has passed.

Figure 9:
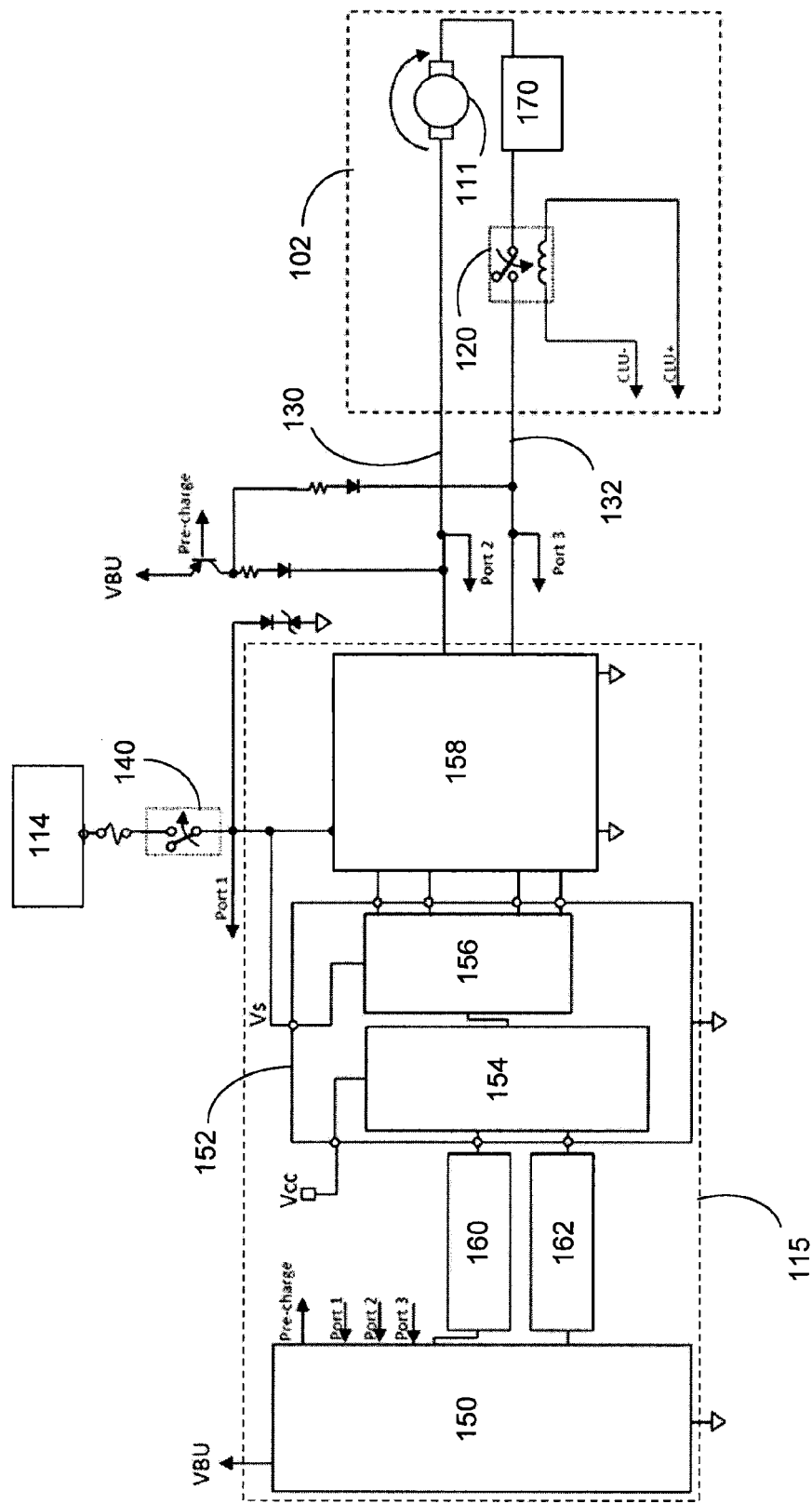
FIG. 9 is a diagram of an exemplary control circuit for the electric motor.

FIG. 9 illustrates an embodiment of a control circuit configured to perform the above-described methods of managing motor 111 back EMF. The control circuit includes the controller 115 electrically connected to the motor 111 and a harness relay 120 of the vehicle 102 via power lines 130, 132. The controller 115 may include a microprocessor 150 that may be connected to one or more integrated circuits (ICs) for controlling the operation of the motor 111, the harness relay 120, and a main relay 140 that electrically connects the control circuit and motor 111 to the battery 114 when the main relay 140 is activated. It will be understood that the ICs that are electrically connected to the microprocessor 150 may alternatively be external to the controller 115 and/or be replaced or substituted with equivalent discrete components where necessary or advantageous for the application.

The ICs may include an H-bridge 158 and an H-bridge driver 152, one or more speed control circuits 160, and one or more communication circuits 162. The H-bridge 158 provides a two-way voltage path between the motor 111 and the battery 114, which powers the motor 111 during powered operations of the motor 111. The H-bridge 158 may be any suitable H-bridge IC, such as a four-gate IC wherein the gates are field-effect transistors (FETs). The H-bridge driver 152 may operate the gates of the H-bridge 158 with a gate driver 156 as is known in the art. The gate driver 156 may receive gate switching sequence commands from stored control logic 154 that converts operating commands from the microprocessor 150 or stored automated commands into switching sequences for the H-bridge 158 gates, which in turn determines how power is applied to the motor 111 (i.e. rotation direction, force magnitude, and duration via pulse width modulation or other known techniques). The microprocessor 150 commands may additionally be processed by the speed control circuits 160 and/or the communication circuits 162 before they are transmitted to the control logic IC 154.

Some or all of the components of the controller 115 may receive an input voltage within the control circuit. In the illustrated example control circuit, at least the microprocessor 150 (via "Port 1") and the gate driver 156 (see voltage $V_S$) receive the input voltage. The input voltage may be provided by the battery 114 when the main relay 140 is activated (i.e., closed) and/or the motor 111 is not being mechanically driven. When the motor 111 is being mechanically driven, however, the motor 111 may generate a back EMF voltage that appears at port 1, and, subsequently, the input voltage of the control circuit. Additional power supplies, such as system backup power (VBU) or onboard batteries (e.g., providing voltage $V_{CC}$ to the control logic 154) may power other components of the system.

The microprocessor 150, control logic 154, or another component of the controller 115 may store instructions for performing methods of managing back EMF by monitoring the back EMF voltage, the motor 111 rotational speed, or both. To monitor voltage as described above with reference to FIG. 3, the controller 115 may detect that the motor 111 is rotating via a current or voltage on a first power line 130 and may close the harness relay 120 in reaction to the detected rotation. Then, the controller 115 may monitor the back EMF voltage across the power lines 130, 132 (e.g., via inputs to the microprocessor 150 at "Port 2" and "Port 3"). The controller 115 may put the H-bridge 158 in a state that allows the current induced by the rotation to flow into the controller 115 (e.g., at Port 1 and $V_S$). The controller 115 may continuously or periodically compare the voltage to the upper voltage threshold. When the upper voltage threshold is met by the voltage, the controller 115 may close the main relay 140 to alleviate the excess voltage. As described above, the voltage (e.g., $V_S$) then drops to the battery 114 voltage, the excess current flowing into and charging the battery 114.

To monitor speed as described above with reference to FIG. 6, the controller 115 may communicate with a sensor 170 configured to detect the rotational speed of the motor 111 and report it to the controller 115. The sensor 170 may be electrically connected to the control circuit, such as on the second power line 132 as illustrated, or may be electrically isolated from the circuit. A suitable type of sensor 170 may depend on whether the sensor 170 is connected to or isolated from the circuit path. In some embodiments, the sensor 170 is a hall effect sensor that senses changes in a magnetic field of the motor 111 to determine the rotational speed. The controller 115 may close the harness relay 120 and put the H-bridge 158 in a state that allows the current induced by the rotation to flow into the controller 115 (e.g., at Port 1 and $V_S$) in reaction to the detected rotation. Alternatively, the controller 115 may leave the harness relay 120 open until an excess rotational speed is detected. The controller 115 may monitor the rotational speed as reported by the sensor 170 and may continuously or periodically compare the rotational speed to the upper rotational speed threshold. When the upper rotational speed threshold is met by the rotational speed, the controller 115 may close the main relay 140 (and the harness relay 120 if it is still open) to alleviate the excess voltage. As described above, the voltage (e.g., $V_S$) then drops to the battery 114 voltage, the excess current flowing into and charging the battery 114.

In addition or alternatively to the above methods of managing back EMF of the motor 111, a protection method for instances when the controller 115 is not powered may be applied. Such an instance may arise when, for example, the battery 114 is completely disconnected from the vehicle 102. The protection method may include breaking the circuit path to prevent the flow of excessive current into the unpowered controller 115 or H-bridge driver 152. Breaking the circuit path may involve leaving the harness relay 120 open while the battery is disconnected.

Figure 10:
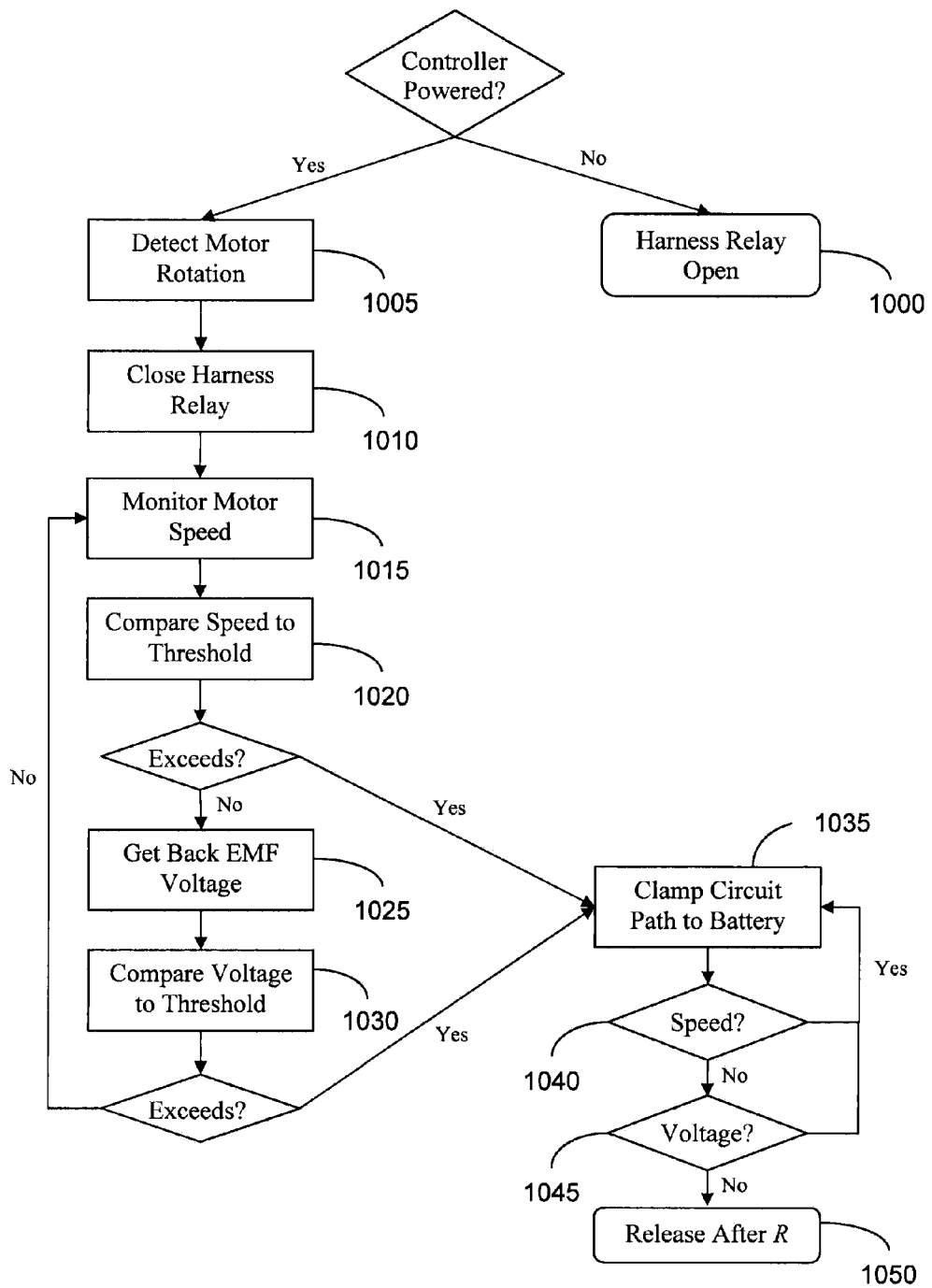
FIG. 10 is a flowchart of another embodiment of a method of managing back EMF voltage of the electric motor.

These methods and devices manage the power generated by mechanical rotation of the electric motor in an automotive application. The methods may be combined to provide a multifaceted management and protection scheme. The methods may be used independently to provide protection to the electrical systems of the vehicle, or can be used in conjunction with one another to provide overlapping protection and redundancy. In some embodiments, the methods may be performed in parallel. For example, the controller 115 may monitor both the back EMF voltage (as in step 300 of FIG. 3) and the motor 111 speed (as in step 600 of FIG. 6), contemporaneously compare the monitored values to their respective thresholds, and clamp the circuit path to the battery 114 in an excess condition. In other embodiments, the methods may be performed in sequence. In one embodiment, illustrated in FIG. 10, at step 1000 if the controller 115 is unpowered, the harness relay 120 remains open and current generated by the motor 111 cannot enter the controller 115. If the controller 115 is powered, at step 1005 the controller 115 detects that the motor 111 is rotating. Detection may be by any suitable means, including sensing a voltage on one of the power lines 130, 132, sensing movement of the motor 111, receiving sensor data indicating that the motor 111 is rotating, and the like. At step 1010, the controller 115 may close the harness relay 120 and, at step 1015, begin monitoring the motor speed as described above. At step 1020 the controller 115 may compare the monitored rotational speed to the upper rotational speed threshold. If the rotational speed exceeds the threshold, the controller 115 may clamp the circuit path to the battery 114 at step 1035.

If the rotational speed is below the upper rotational speed threshold, at step 1025 the controller 115 may obtain the value of the back EMF voltage as described above. At step 1030, the controller 115 may compare the voltage to the upper voltage threshold, and may clamp the circuit path to the battery 114 (i.e., by closing the main relay 140) at step 1035 if the threshold is exceeded. If the upper voltage threshold is not exceeded, the controller 115 may return to monitoring the speed (as illustrated) or the voltage. Once the circuit path is clamped to the battery 114, the controller 115 may continuously or periodically check both the motor 111 rotational speed (at step 1040) and the back EMF voltage (at step 1045) to see if both have returned to a safe level. At step 1050, the controller 115 may release the clamp, after the release time R in some embodiments, when safe levels of speed and voltage are reported.

Regulation of Heat Generated by an Electric Motor

Figure 11:
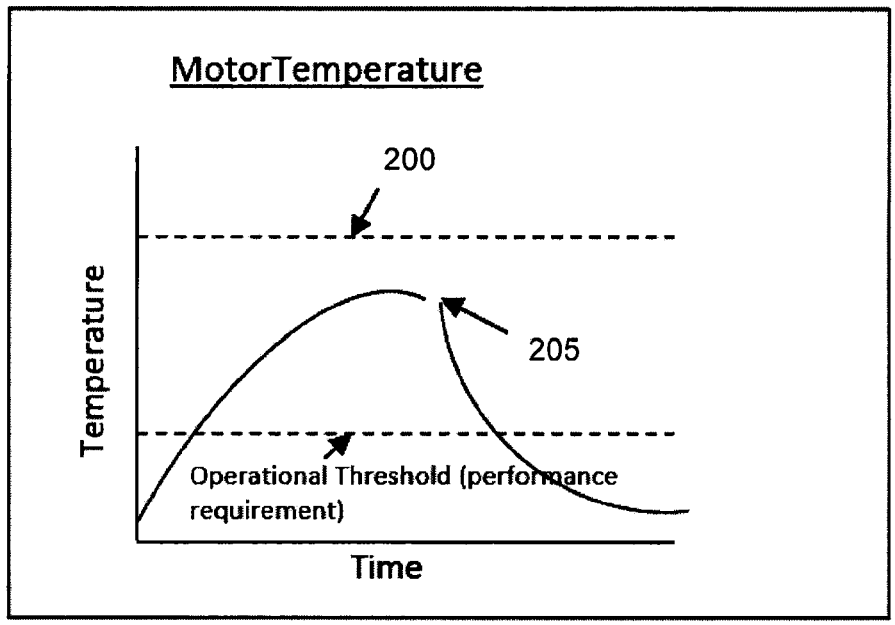
FIGS. 11 and 12 are charts depicting a motor temperature over time in different protective embodiments.

Controlling the amount of heat generated by an electric motor during use is a consideration in many applications, such as powered door, hatch, and liftgate automotive applications. Typically, physical components are used to temporarily deactivate the motor to allow it to cool. Due to reduced packaging constraints, the space available for electric motors used in automotive applications has decreased. In order to produce increasingly compact electric motors, one component that may be eliminated in certain applications is a positive-temperature-coefficient (PTC) thermal breaker. With reference to FIG. 11, the thermal breaker is typically configured to heat up and ultimately block current flow to the motor 111 at some temperature 205 below the motor damage threshold 200, thus preventing current flow runaway that could potentially damage the electric motor 111 and associated electronics. Unfortunately, in addition to the disadvantages of PTC thermal breakers described above, the breaker can be tripped at any time during operation of the motor 111, resulting in sudden and unannounced operational halts that can cause damage and injury. However, without a thermal breaker, the heat generated by the electric motor 111 goes unchecked and can have detrimental impacts on the electric motor and associated components.

Figure 12:
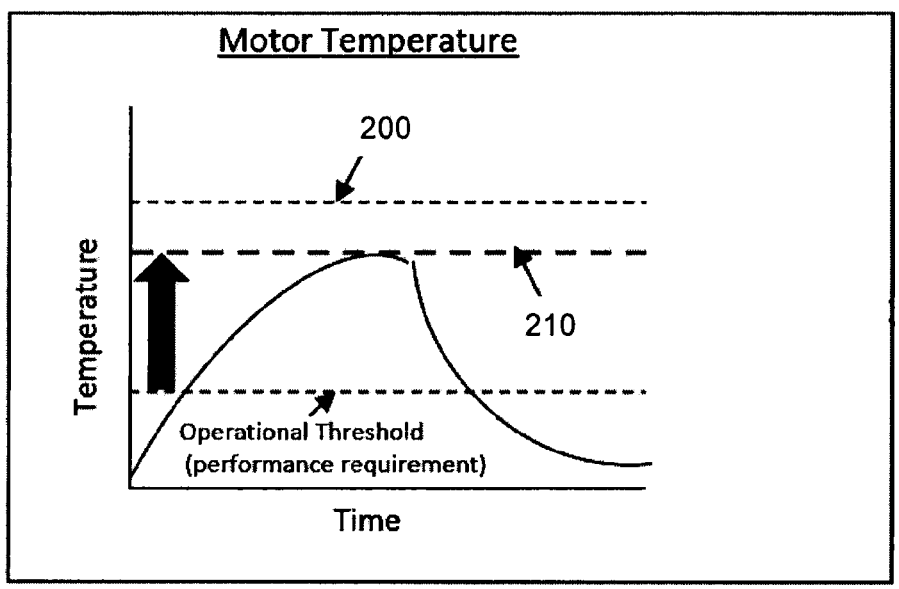

To address these heat generation issues, the amount of heat generated in an electric motor can be regulated by the electronic controller 115 (e.g., via a software implementation), eliminating components within the motor 111. For example, and with initial reference to FIG. 12, cycle limitation (the number of motor 111 cycles permissible is regulated), energy consumption limitation (the current consumed by the motor 111, which is proportional to the temperature of the motor 111, is measured and integrated), and failure mode limitation (detection of abnormally high loads or operational failure) methods can be employed to regulate the amount of heat generated in the motor 111 before the motor 111 may be temporarily deactivated to allow the temperature of the motor to decrease.

These methods can be applied individually, and further may be applied in conjunction with each other to form an even more robust approach to managing heat generation. For instance, the energy consumption limitation method may supplement the cycle limitation method to account for factors such as the ambient temperature or increased loads on the motor 111 (e.g., when a powered liftgate is being operated at an incline). These concepts allow for smaller packaging and the ability to predict when an overheat and/or termination condition will arise, reducing incidents of unexpected terminations occurring without warning in PTC-based overheat protection systems.

Figure 13:
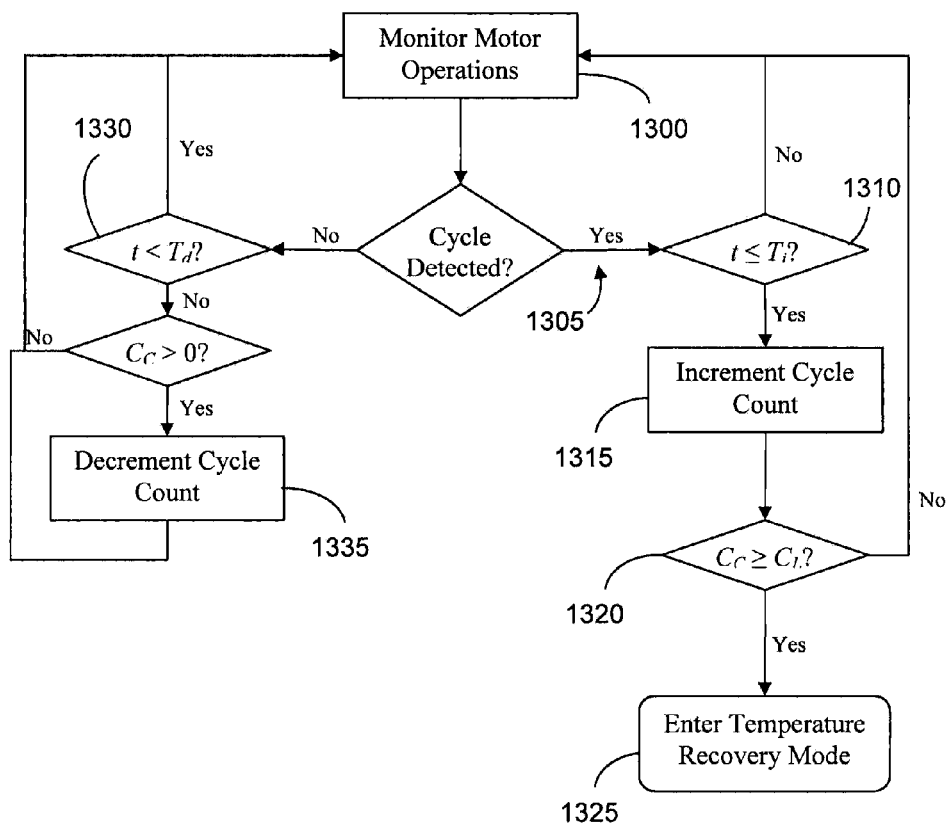
FIG. 13 is a flowchart of one embodiment of a method of regulating heat generated by an electric motor.
Figure 14:
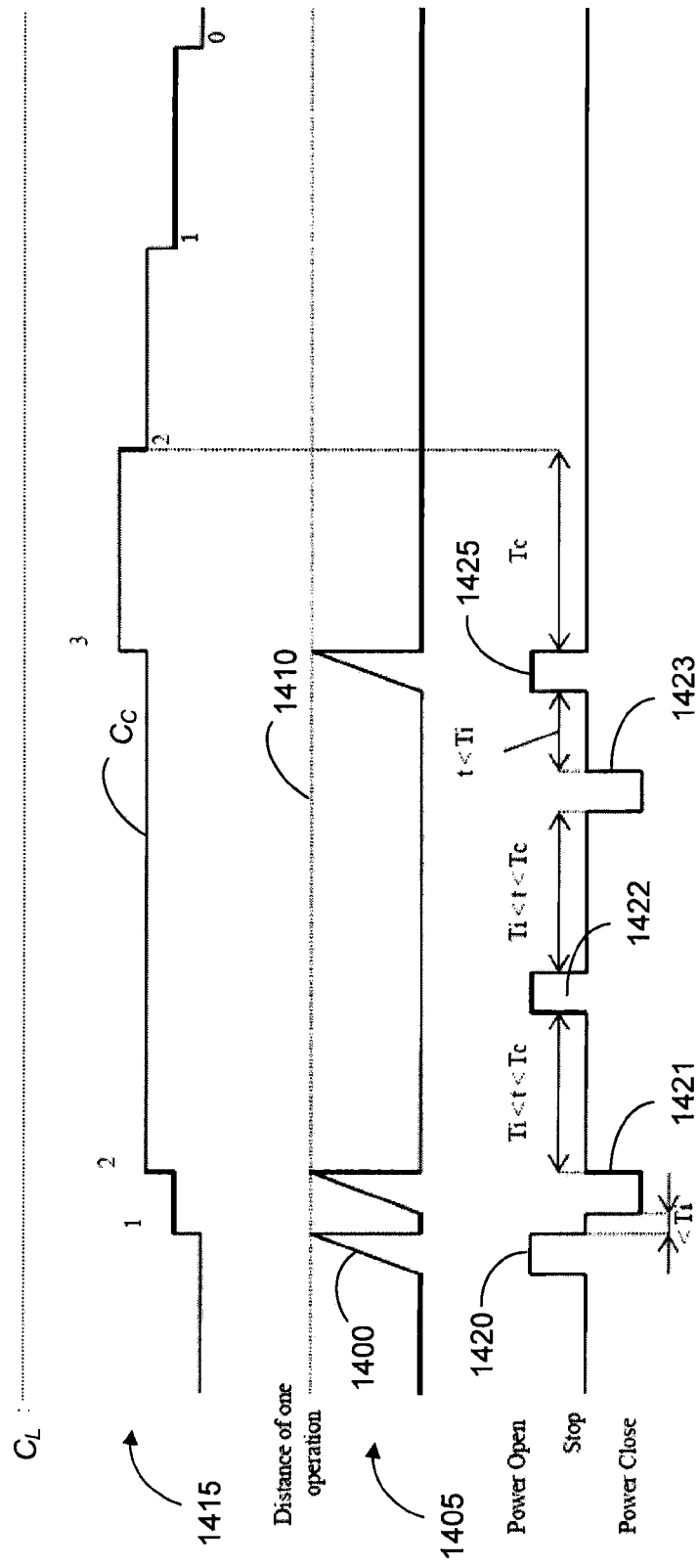
FIG. 14 is a timing diagram illustrating an application of the method of FIG. 13.

The cycle limitation method involves regulating the permissible number of cycles, each cycle being a complete operation of the motor 111. For example, when a user presses a button on a key fob, causing the PTG to open, a cycle is the operation of moving the PTG from a fully closed state to a fully open state. Referring to FIGS. 13 and 14, the controller 115 may perform an embodiment of the cycle limitation method by tracking the number of cycles of the motor 111. The controller 115 may monitor the operations of the motor 111, at step 1300, waiting for a cycle to occur. At step 1305, the controller detects a cycle. The controller 115 may use any suitable method to determine that a cycle (i.e., a complete PTG operation) has occurred. For example, according to the timing diagram of FIG. 14, the controller 115 may measure the duration of a pulse correlating to the powered operation. The value of a pulse (e.g., the first pulse 1400) on the pulse graph 1405 increases linearly with time and indicates a cycle when it reaches the maximum pulse value 1410 (correlating to the distance of one complete operation).

The controller 115 may store or otherwise retain a predetermined increment time $T_I$, a predetermined decrement time $T_c$, a predetermined numerical cycle limit $C_L$, and a variable cycle count $C_C$. The values of $T_I$, $T_c$, and $C_L$ may be selected to reflect the heating and cooling characteristics of the motor 111. That is, the increment time $T_I$ may be approximately the duration that the motor 111 must remain idle after a cycle for the motor 111 to cool to its pre-cycle temperature (i.e., the temperature of the motor 111 before the cycle occurred). The decrement time $T_c$ may be approximately the duration that the motor 111 must remain idle after a cycle for the motor 111 to cool to its temperature of before the previous two cycles. The cycle limit may be the maximum number of substantially contemporaneous cycles (i.e., a cycle occurs within the increment time $T_i$ after the previous cycle) that the motor 111 can tolerate before its temperature becomes dangerously high. Each of the increment time $T_i$, decrement time Tc, and cycle limit $C_L$ may be affected by the ambient temperature surrounding the motor 111, which value may be transmitted to the controller 115 by a temperature sensor. In particular, higher ambient temperatures may increase the decrement time Tc and decrease the cycle limit $C_L$ because the motor 111 takes longer to cool in such temperatures. TABLE 1 is a table of example values for $T_i$, $T_c$, and $C_L$ in different ambient temperature ranges, where time durations are measured in seconds.

TABLE 1

| TEMP (Deg C.) | $C_L$ | $T_i$ | $T_c$ |
| --- | --- | --- | --- |
| Below 35 | 20 | 30 | 60 |
| Btwn 35 and 50 | 15 | 30 | 80 |
| Above 50 | 10 | 30 | 120 |

When the controller 115 detects the cycle, the controller checks the time elapsed t since the most recent previous cycle was detected and compares the time elapsed t to the increment time $T_i$, at step 1310. If the time elapsed t is less than or equal to the increment time $T_i$, at step 315 the controller 115 increments the value of the cycle count $C_C$. FIG. 4A illustrates an example, where a second operation 1421 follows a first operation 1420 by a time t that is less than the increment time $T_i$. The cycle count graph 1415 shows the cycle count $C_C$ being incremented by one when the second pulse 1401 reaches the maximum pulse value 1410. In contrast, if the time elapsed t since the previous cycle is greater than the increment time $T_i$, the cycle is not counted in the cycle count $C_C$ and the controller 115 returns to monitoring the motor operations (step 300). For example, the third operation 1422 and fourth operation 1423 occur after the increment time $T_i$ has passed since the previous operation and the cycle count $C_C$ is not incremented.

When the cycle count $C_C$ is incremented at step 1315, the controller 1315 may then compare the value of the cycle count $C_C$ to the cycle limit $C_L$. If the cycle limit $C_L$ has been reached or exceeded, at step 1325 the controller 115 may enter a temperature recovery mode, wherein one or more functions of the PTG (or other device being driven by the motor 111) may be temporarily disabled as described below to allow the motor 111 to cool. It will be understood that the controller 115 may perform this comparison at another point in the described method, such as immediately before or after detecting the cycle, which may cause the controller 115 to enter the temperature recovery mode earlier or later as needed.

While the controller 115 is monitoring the motor operations and a cycle is not detected, the controller 115 may compare the elapsed time t since the last cycle to the decrement timer Tc, at step 1330. When the elapsed time t meets or exceeds the decrement timer Tc, at step 1335 the controller 115 may decrement the cycle count $C_C$ if the cycle count is greater than zero. An example is illustrated in FIG. 14, where the cycle count $C_C$ is decremented gradually to zero as the decrement time Tc passes repeatedly with no cycles detected after a last operation 1425.

In some applications, the cycle limitation method may not be sufficiently accurate or responsive due to it counting complete operations of the motor. For example, partial operations, increased loads on the motor 111, and other conditions can contribute to the motor 111 temperature but are not directly added to the cycle count. An energy consumption limitation method may be used alternatively or complementarily to the cycle limitation method to account for motor 111 operation that may not be tracked by the cycle count limitation method. The energy consumption limitation method involves measuring and integrating the current consumed by the motor 111; this value is approximately proportional to the heat generated by and the temperature of the motor 111. The calculated energy figures can be compared to threshold values stored in a lookup table. When the threshold is exceeded, operation of the motor may be disabled.

Figure 15A:
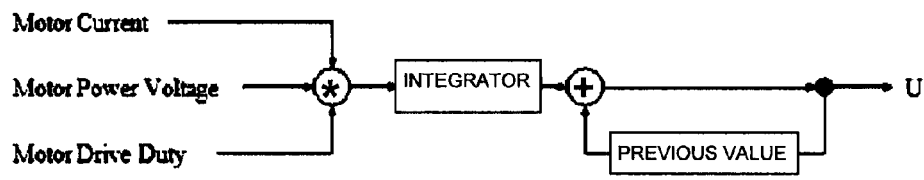
FIG. 15A is a state diagram of a device for calculating the consumed energy of an electric motor.
Figure 15B:
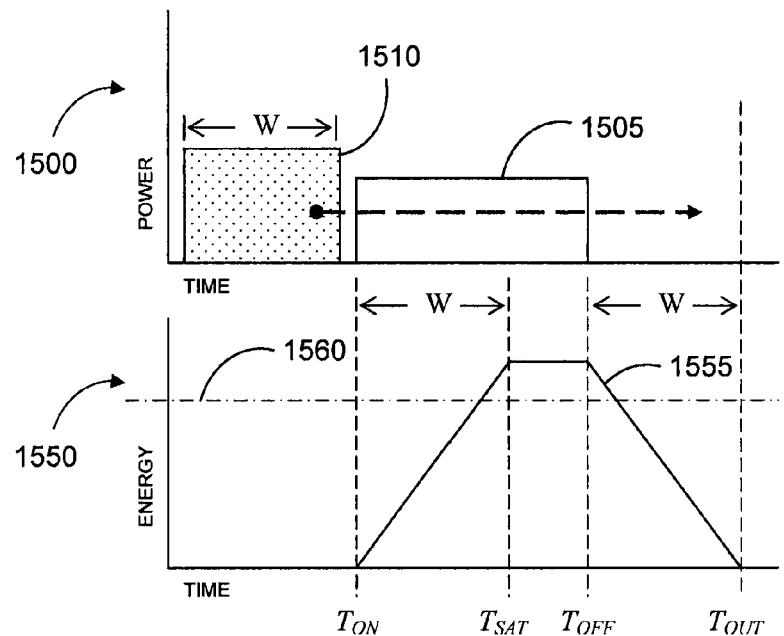
FIG. 15B is a timing diagram of a method of calculating the consumed energy of an electric motor.

FIGS. 15A-B illustrate calculation of the energy consumed by the motor 111. Referring to FIG. 15A, the energy U may be calculated with the equation:

$$U = \int P \, dt$$

where P is the power (wattage) applied by the motor 111 and may be obtained for any instant of time by multiplying the motor current by the motor power voltage and scaling by the motor drive duty, if any. This value is integrated at each unit of time within the limits of integration and summed with the previous calculated value to find the energy U consumed as of that time. The limits of integration may define a suitable time period across which the power is integrated. FIG. 15B illustrates a power graph 1500 and an energy graph 1550 showing the calculated power applied 1505 and energy consumed 1555, respectively, by the motor 111 across the same time interval. The motor 111 is performing a powered operation from time $T_{ON}$ to time $T_{OFF}$. The amount of power applied is integrated over a continuously updated time in an integration window 1510 having limits of integration W. The calculated integration values, representative of the instantaneous energy consumed, are summed as the integration window 1510 moves across the period of powered operation. Thus, as the integration window 1510 enters and covers the power 1505 area, the energy 1555 increases until an energy saturation point, when the integration window 1510 is fully within the power 1505, at time $T_{SAT}$. The calculated energy 1555 plateaus while the integration window 1510 is saturated, until the powered operation is stopped at time $T_{OFF}$. Calculation of the consumed energy U may continue, decreasing until the integration window 1510 fully exits the power 1505 area at time $T_{OUT}$.

Figure 15C:
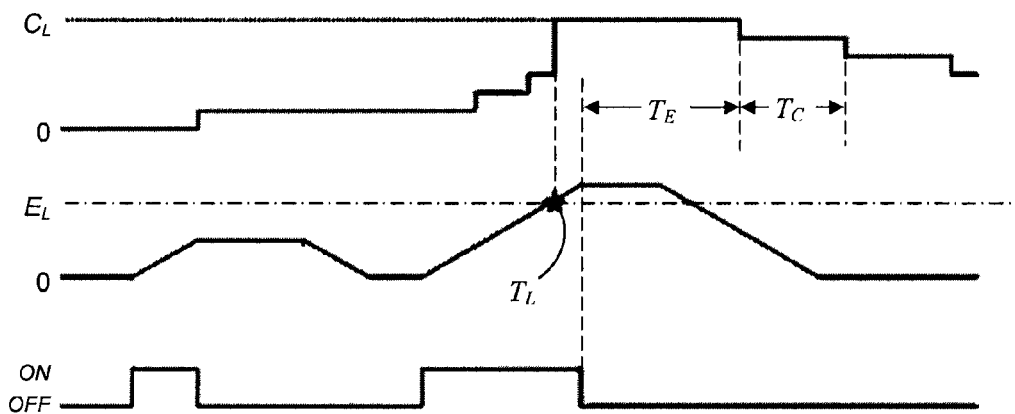
FIG. 15C is a timing diagram of a method of regulating heat generated by an electric motor based on consumed energy.

The controller 115 may track the consumed energy U and compare it to one or more energy thresholds 1560. The energy thresholds 1560 may be stored, such as in a lookup table, by the controller 115. In some embodiments, when the consumed energy U exceeds the energy threshold 1560, the controller 115 may disable one or more operations of the motor 111 according to the temperature recovery mode described herein. Referring to FIG. 15C, in some embodiments the energy consumption limitation may be used in conjunction with the cycle count limitation. In the illustrated example, when the calculated consumed energy U exceeds an energy limit $E_L$ (which may correspond to the energy threshold 1560 of FIG. 15B) at time $T_L$, the controller 115 sets the cycle count $C_C$ to the cycle limit $C_L$ to invoke the temperature recovery mode. The cycle count decrement process may also be augmented by providing an energy decrement time $T_E$ that must elapse after a powered operation is terminated before the cycle count $C_C$ may be decremented. In other embodiments, the controller 115 may merely increment the cycle count $C_C$ as normal when the energy limit $E_L$ is exceeded.

In still other embodiments, the controller 115 may use a plurality of integration windows 1510, setting a first limit of integration for a first window 1510 and a second limit of integration larger than the first limit of integration for the second window 1510, to provide for monitoring different levels and periods of consumption. For example, one setting may protect for short periods of high energy consumption, while the second setting may protect for long periods of prolonged energy consumption. Correspondingly, a plurality of energy thresholds 1560 may be set to accommodate the monitoring goals of the different integration windows.

The failure mode limitation method considers when abnormally high loads are applied or if a failure condition has occurred that increases the load. While such conditions could be detected by the energy consumption limitation method, tuning the consumed energy limits of integration to accommodate these conditions applies performance constraints to the system that could be better managed if the failure condition were addressed separately. Specifically, if a failure condition is detected, the cycle limit may be set to the maximum value and the motor disabled.

Figure 16:
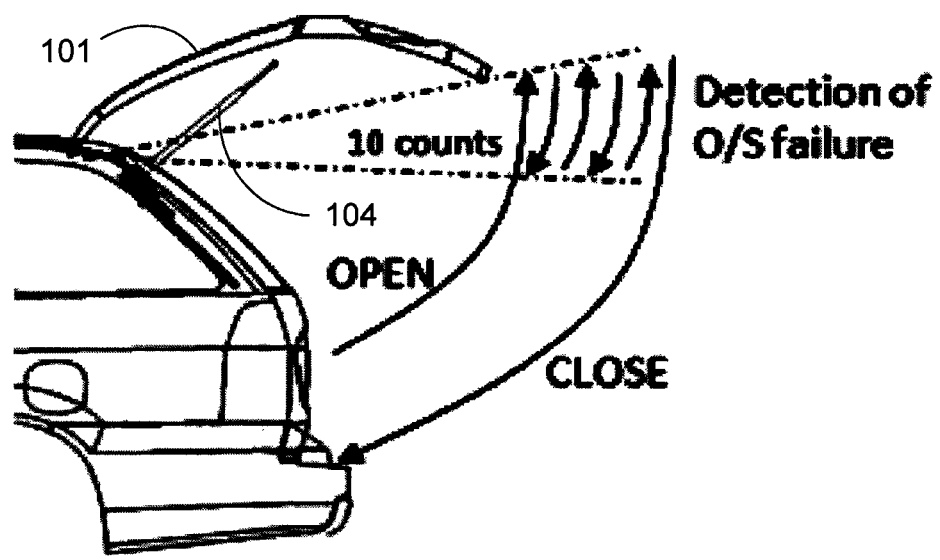
FIG. 16 is another side plan view of a power tailgate on a vehicle.
Figure 17:
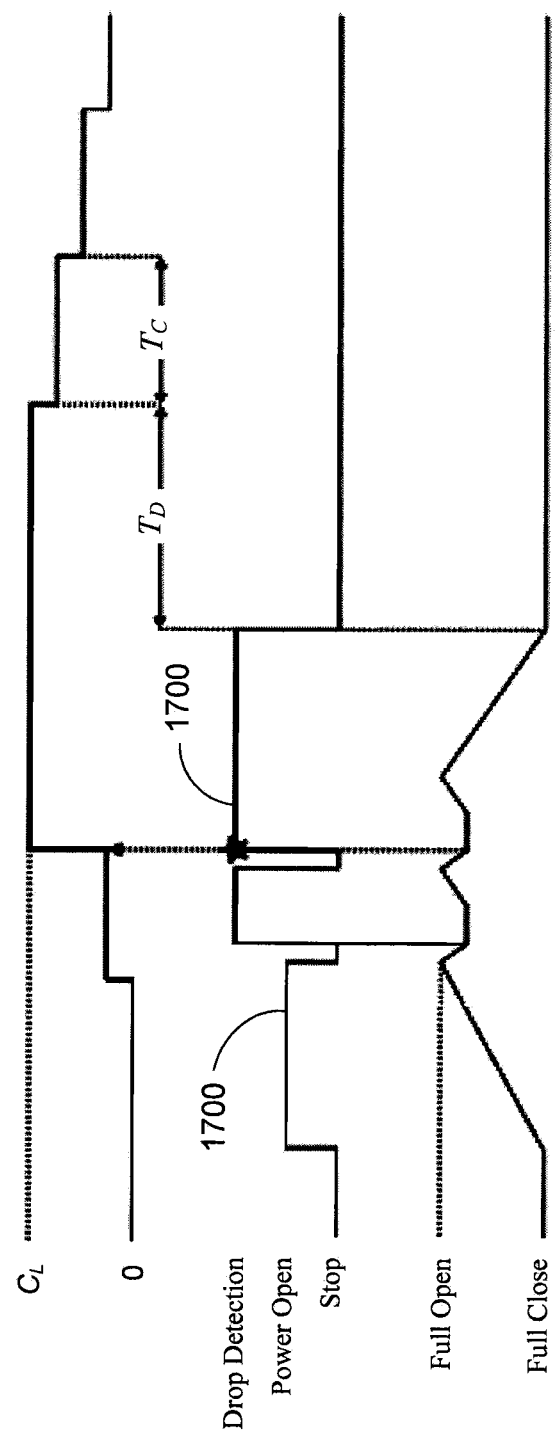
FIG. 17 is a timing diagram of a method of regulating heat generated by an electric motor based on a failure condition detection.

FIG. 16 illustrates an example failure condition, known as "open stay failure," for which the controller 115 may be configured to protect the motor 111. An open stay failure occurs when a device that is configured to hold the PTG open, such as the biasing member 104, fails to do so. For PTGs and other doors, if open stay fails, the PTG can open under high load but will drop under its own weight. The high load open operation may generate large amounts of heat. The controller 115 may be configured to detect the open stay failure. In one embodiment, the controller 115 may count a predetermined number, such as ten, of rapidly occurring open and/or close operations. In another embodiment, illustrated in FIG. 17, the controller 115 may detect one or more drops 1700 indicating that the PTG has failed to stay open. At a threshold number of repeated drops 1700 (two sequential drops 1700 from the "Full Open" PTG position in the illustrated embodiment), the controller 115 may perform the close operation to secure the PTG in a closed position, and may set the cycle count CC to the cycle limit CL to incite entry into the temperature recovery mode. The cycle count decrement process may also be augmented by providing a failure decrement time $T_D$ that must elapse after a failure is detected before the cycle count $C_C$ may be decremented.

Figure 18:
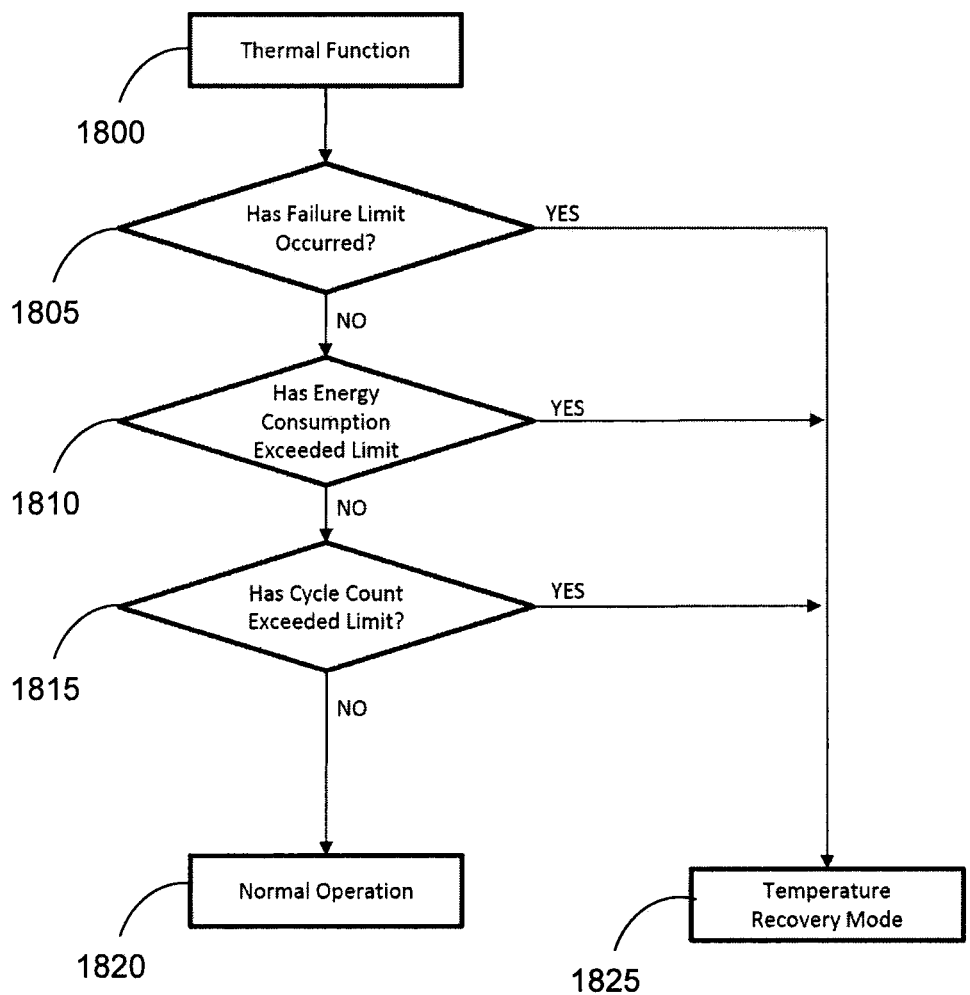
FIG. 18 is a flowchart of another embodiment of a method of regulating heat generated by an electric motor.

As described above, the cycle limitation, energy consumption limitation, and failure mode limitation methods may be applied together to provide a robust electronically-controlled motor 111 operation management system for maintaining the temperature of and heat produced by the motor 111 below a damaging level. Several methods of combining the methods are described above. Referring to FIG. 18, the controller 115 may evaluate the result of the different methods to determine whether to operate the motor 111 normally or enter the temperature recovery mode. The thermal limit of the motor 111 is reached by detection of excessive operation cycles, high energy consumption, or failure mode limitation (e.g., open stay failure detection). In one embodiment, when a thermal function 1800, such as a powered operation of the PTG, is underway, the controller 115 checks whether a failure limit has occurred at step 1805. If not, the controller 115 checks whether energy consumption of the motor 111 has exceeded its limit at step 1810. If not, the controller 115 checks whether the cycle count has exceeded its limit at step 1815. If not, the controller 115 proceeds with normal operation 1820 of the motor 111. If any of the queries of steps 1805, 1810, or 1815 are answered in the affirmative, the controller 115 may enter the temperature recovery mode 1825 of operating the motor 111.

While previously existing technology provides no advance warning prior to deactivation of the motor and thus operation, the current concept allows the operation to be completed before operation is restricted to allow the system to cool, without power interruption and with continuous system control. Thus, when the thermal limit has been reached, the controller 115 may enter a temperature recovery mode in which several protective measures may be taken. The current open or close operation of the PTG may be completed, and a notification alarm may sound (e.g., continuously) until the current operation is completed. Commands from input devices, such as a key fob, door switch, or seat switch, may be prohibited. Manual operation of a PTG or other door handle may interrupt the current operation. If there is no open stay failure, the controller 115 may reverse direction of the PTG if a pinching or obstacle in the door path is detected. However, if there is an open stay failure, such a detection may stop the operation of the PTG. Once the operation is completed or terminated by other input, the controller 115 may deactivate power to the motor. TABLE 2 illustrates an example group of operations in the temperature recovery mode.

TABLE 2

| Situation | Obstacle Detection | Outer Handle Input | Switch/ Fob Input | Buzzer |
| --- | --- | --- | --- | --- |
| Cycle Limit | Reverse Direction (3x MAX) | Power OFF | Ignore | Continuous Alarm |
| Energy Consumption Limit | Reverse Direction (3x MAX) | Power OFF | Ignore | Continuous Alarm |
| Failure Mode Limit | Power OFF | Power OFF | Ignore | Continuous Alarm |
| Drop Detection | Power OFF | Power OFF | Ignore | Continuous Alarm |

Figure 19:
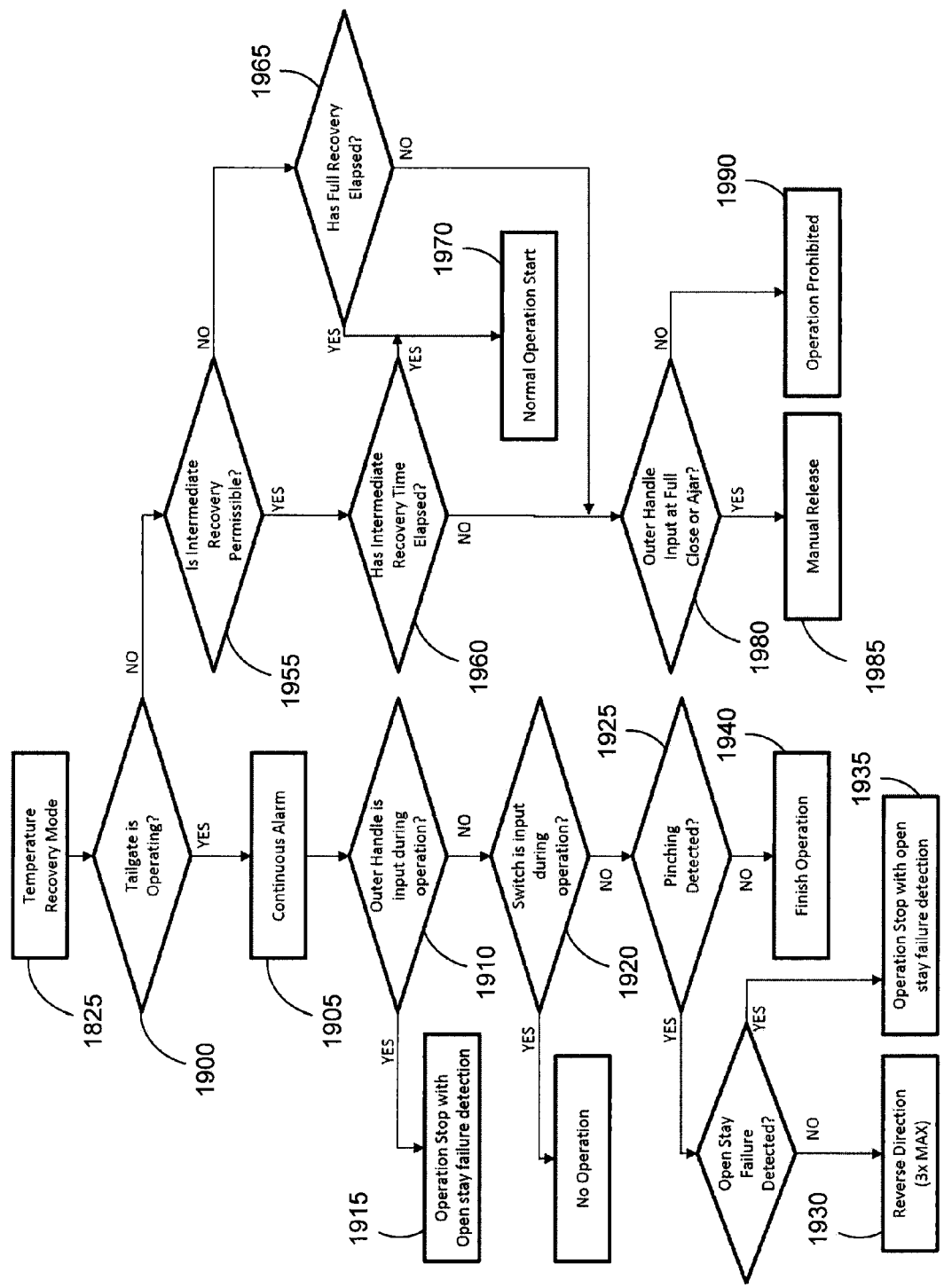
FIG. 19 is a flowchart of an embodiment of a temperature recovery method for an electric motor.

FIG. 19 illustrates an example embodiment of the temperature recovery mode 1825. Upon entry into the temperature recovery mode 1825, at step 1900 the controller 115 determines if the PTG is operating. If so, at step 1905 the controller 115 may sound the continuous alarm to the PTG user. The controller 115 allows the operation to complete as described above. During the operation, if the controller 115 detects an input from an outer handle of the PTG (at step 1910, indicating the handle is being actuated by the user), the controller may terminate the operation (step 1915). At step 1920, if the controller 115 detects a seat switch or key fob input, the controller 115 ignores the input. At step 1925, if the controller 115 detects a pinching or another obstacle in the path of the PTG, and there is no open stay failure, the controller 115 may reverse the direction of the PTG at step 1930. The controller 115 may reverse the direction up to three times if obstacles are detected. If there is an open stay failure when pinching is detected, the controller 115 may terminate the operation at step 1935. If no pinching is detected, the controller 115 may finish the operation (step 1940).

If the controller 115 determines that the PTG is not operating, at step 1955 the controller 115 may attempt an intermediate recovery of the motor 111 to normal operating parameters. An intermediate recovery is a recovery of the normal operating parameters before the full recovery period has elapsed. If the controller 115 determines that an intermediate recovery is permissible, at step 1960 the controller 115 determines whether a predetermined intermediate recovery time has elapsed since the PTG completed its operation. If the controller 115 determines at step 1955 that intermediate recovery is not permissible, the controller 115 checks whether the full recovery time has elapsed since the PTG completed its operation. If the inquiry at steps 1960 or 1965 is answered in the affirmative, at step 1970 the controller 115 may resume normal operation of the motor 111. If the inquiry at steps 1960 or 1965 is answered in the negative, at step 1980 the controller 115 may receive an outer input from the door handle and determine whether the PTG is in a fully closed or ajar (but not fully open) position. If so, at step 1985 the controller 115 may permit manual release of the PTG but if not, at step 1990 the controller 115 may prohibit the handle operation.

Tracking Manual Operation for Motor Thermal Protection

Figure 20:
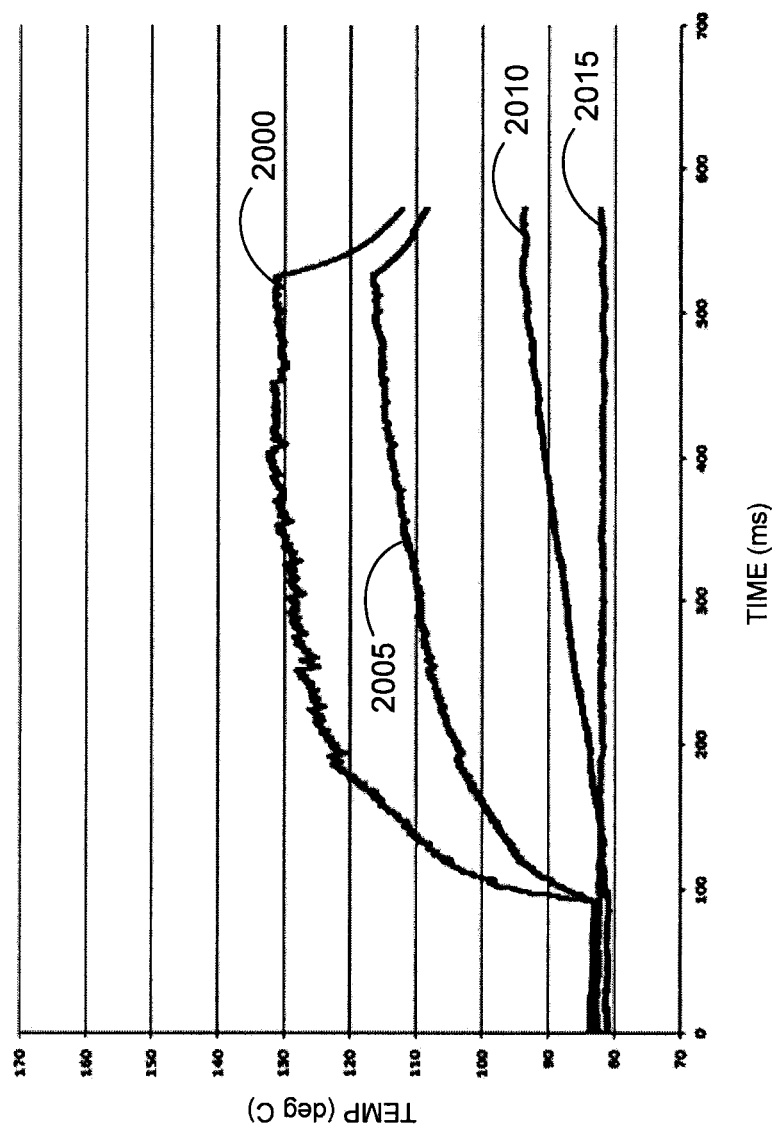
FIG. 20 is a chart depicting the temperatures of several components of an electric motor as the motor is operated over time.

When a permanent magnet DC motor is being mechanically driven, the DC motor acts as a generator (see above description related to the generation of back EMF). The generated voltage can create heat within the motor that, if excessive, can result in the degradation or failure of the motor. FIG. 20 illustrates temperature curves for three components of the motor 111 as the motor 111 is manually (i.e., mechanically) operated 70 times: a rear bearing 2000; a brush 2005; and a front bearing 2010. The ambient temperature curve 2015 is also shown. Electronic control algorithms as described above may advantageously account for the manual operations of the motor 111 in calculating the temperature of the motor 111.

The described method includes an algorithm to manage the heat generated due to manual operation of an electric motor, such as by manually moving a powered door/hatch/PTG system. Once the thermal limit threshold is reached, manual operation is permitted and electrically powered operation is prohibited. The maximum number of possible cycles is specified to prevent extended and unnecessary deactivation. Also, even once the thermal limit associated with the electrically powered mode of motor operation is reached, the ability to track and include the mechanical operation in the calculation of an estimated overall motor heat allows manual operation even without any clutch mechanism. Generally, both manual operation and electrical operation of the motor may be deactivated or suspended to provide a sufficient margin against motor damage.

Figure 21:
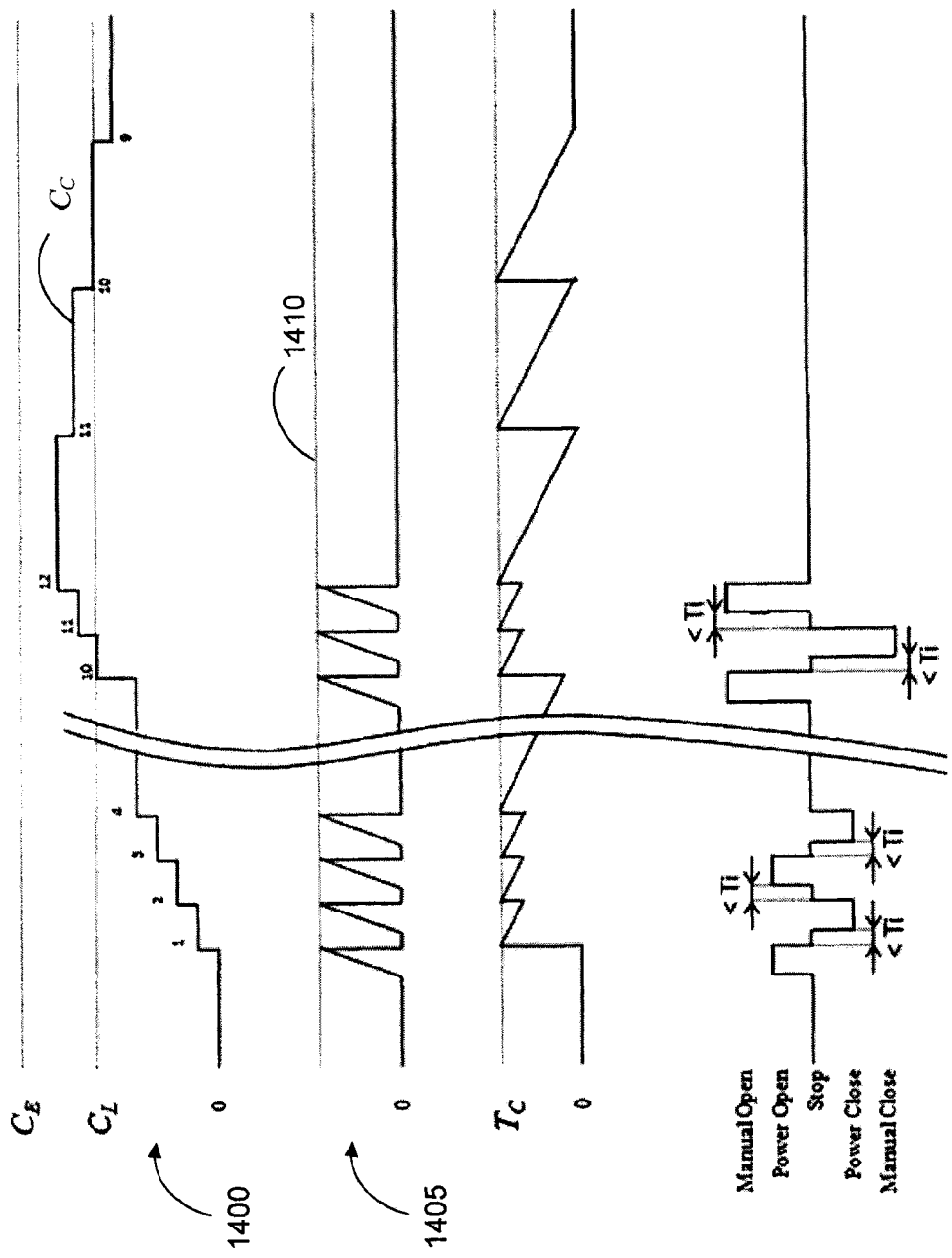
FIG. 21 is a timing diagram of a method of regulating heat generated by an electric motor based on powered and manual operations of the motor.

In some embodiments, the manual operations may be counted just as powered operations are counted, and may be added to the cycle count $C_C$ that tracks the motor 111 temperature. FIG. 21 illustrates an embodiment of the manual tracking method that provides extended protection by increasing the recovery time for powered operations. The manual operation at the thermal limit incorporates an extended duration wait because the cycle count $C_C$ is increased a set amount above the cycle limit $C_L$, which extends the duration of the cycle decrement process. An extended cycle limit $C_E$ is maintained by the controller 115. The extended cycle limit $C_E$ may be a predetermined number of cycles above the cycle limit $C_L$. The controller 115 may count manual open and close cycles using any of the methods described above. When the cycle count $C_C$ reaches the cycle limit $C_L$, powered operation of the PTG may be limited as described above, but the controller 115 may allow manual operations to continue. The controller 115 may continue counting and allowing manual operations in the cycle count $C_C$ above the cycle limit $C_L$, until the extended cycle limit $C_E$ is reached. When the cycle count $C_C$ reaches the extended cycle limit $C_E$, the controller 115 may prohibit manual operations as well as powered operations until the cycle count $C_C$ decrements, as described above, to a safe level (i.e., below the cycle limit $C_L$). Alternatively, when the cycle count $C_C$ falls below the extended cycle limit $C_E$, manual operations may once again be allowed, while powered operations are prohibited. When the cycle count $C_C$ falls below the cycle limit $C_L$, both powered and manual operations will be allowed.

Figure 22:
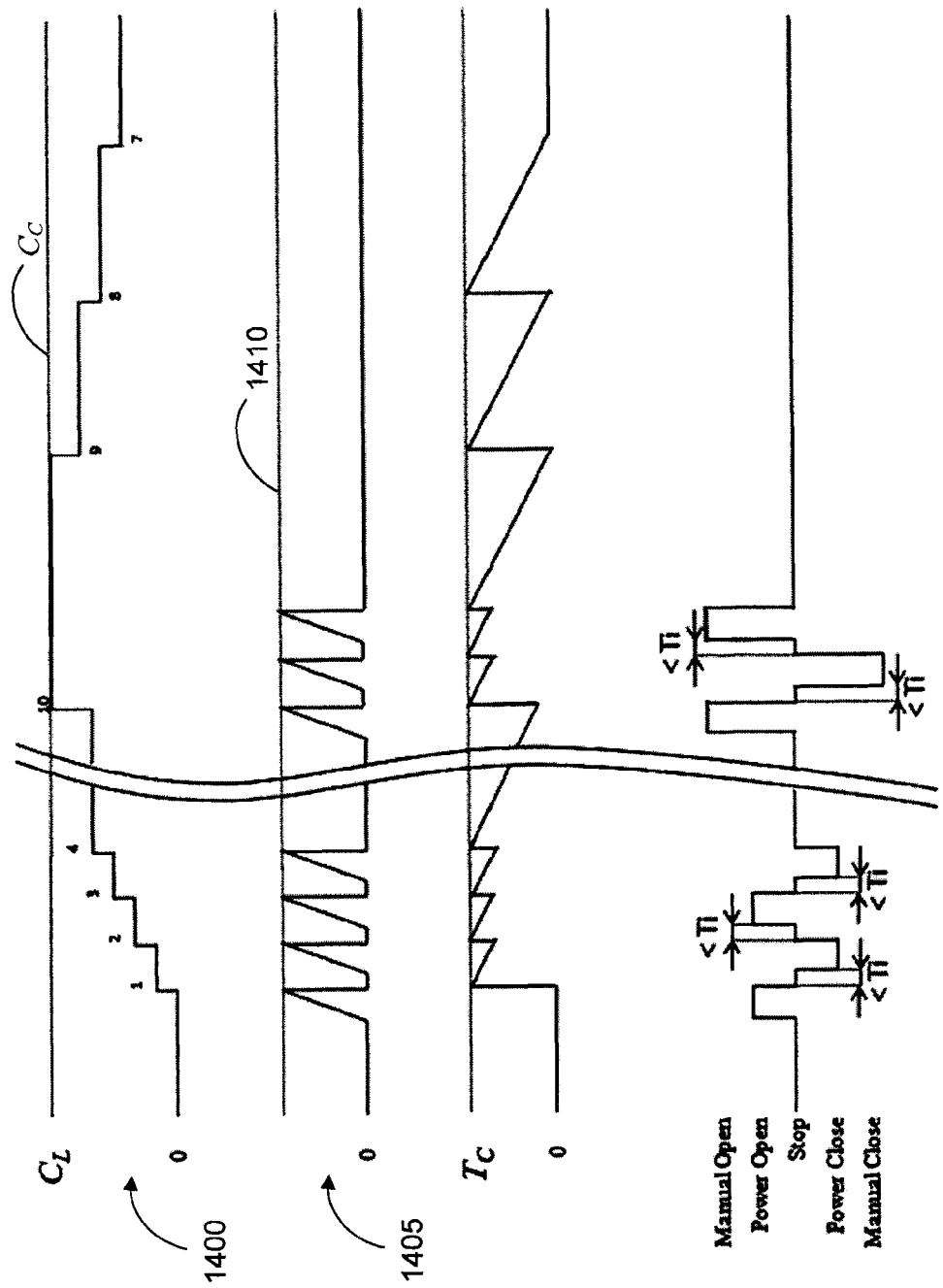
FIG. 22 is a timing diagram of another method of regulating heat generated by an electric motor based on powered and manual operations of the motor.

FIG. 22 illustrates an embodiment of the manual operation tracking method that provides improved performance but reduced protection compared to the embodiment of FIG. 21 by reducing the recovery time for powered operations. The manual operation at the thermal limit does not have an increased duration because the cycle count is not increased a set amount once the cycle limit is reached. Therefore, the decrement timer must perform fewer cycles to reduce the cumulative cycle count. In this embodiment, the controller 115 may increment the cycle count $C_C$ with powered or manual operations as above, but when the cycle limit $C_L$ is reached, the controller 115 may disable both powered and manual operations of the motor 111. The controller 115 may decrement the cycle count $C_C$ as described above to restore normal operations of the motor 111.

Figure 23:
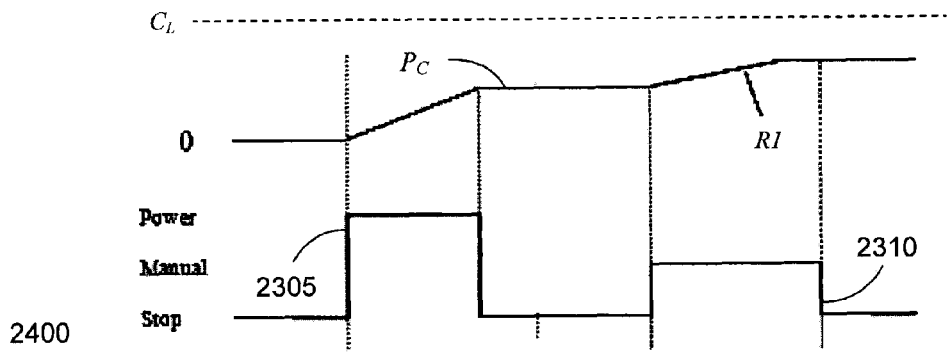
FIG. 23 is a timing diagram of another method of regulating heat generated by an electric motor based on powered and manual operations of the motor.

FIG. 23 illustrates another embodiment of the manual operation tracking method, wherein the manual operations may be counted at some multiple R1 that is greater or less than one, so that the manual operations weigh more or less than the powered operations within a pulse count $P_C$. The pulse count $P_C$ may be added to the cycle count $C_C$ of the electrically powered operations of the motor 111 or may replace the cycle count $C_C$, such that the controller 115 tracks motor 111 electrical pulses instead of cycles up to the cycle limit $C_L$. The value of the pulse count $P_C$ may be an integer or a non-integer. For example, FIG. 23 illustrates a timing diagram in which a powered operation 2305 increases the pulse count $P_C$ by one unit, and a manual operation 2310 increases the pulse count $P_C$ by R1, which is some constant less than one. Thus, in the illustrated embodiment the manual operation has less weight than the powered operation in the pulse count $P_C$.

Motor Thermal Protection After Data Interruption

When an electronic controller 115 is used to implement a method of thermal protection for an electric motor 111, problems can arise if the relevant thermal data is corrupted, not retained during a power loss event (e.g., battery 114 disconnect resulting in clearing the memory of the controller 115 or other memory storage device), or the controller 115 is otherwise not able to track the electric motor 111 performance and parameters necessary for thermal management. If the electric motor 111 is nearing a thermal limit (e.g., the cycle limit $C_L$) and the power cycles, thus erasing the historical thermal data, the motor 111 may be damaged with further use once the power is reapplied.

Figure 24:
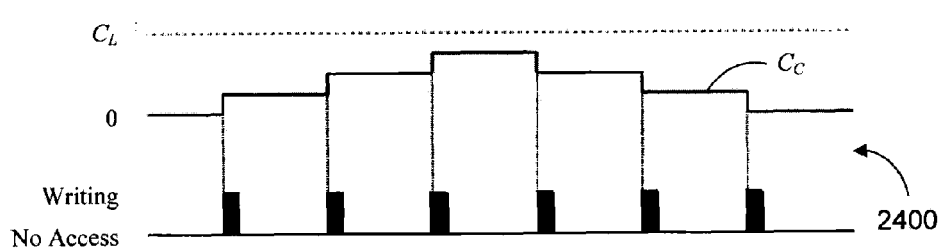
FIG. 24 is a timing diagram of a method of writing relevant parameter data to non-volatile memory.
Figure 25:
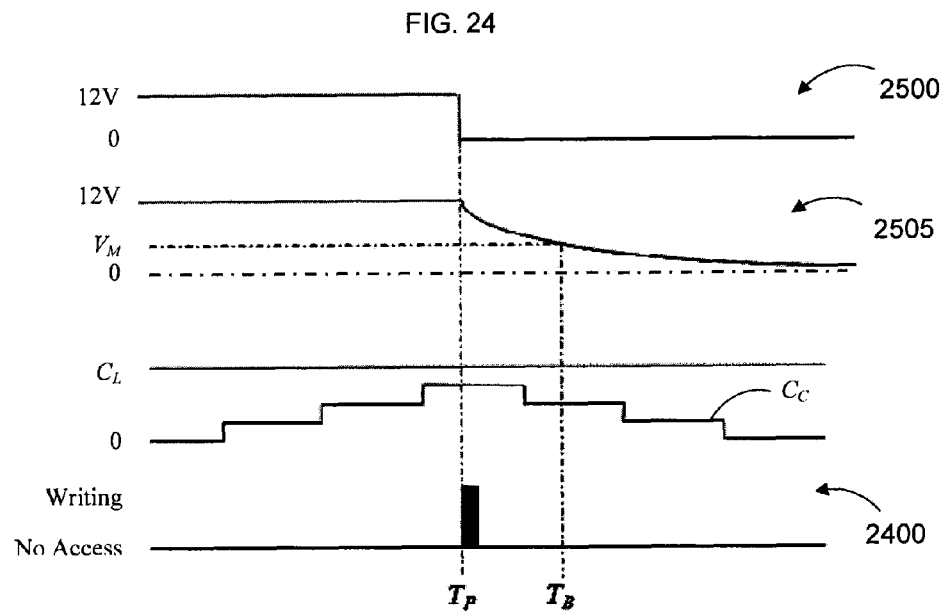
FIG. 25 is a timing diagram of another method of writing relevant parameter data to non-volatile memory.

In order to overcome the problems associated with data loss, a method is provided to store in non-volatile memory the relevant data parameters that are used to identify or correlate the temperature of the electric motor 111. The relevant data parameters may include, without limitation, the cycle count CC, the pulse count PC, any calculated energy consumption values, any detected failure conditions, and any other parameter having a value that may contribute to retrieve the motor 111 state when power is reapplied. In one embodiment, illustrated in FIG. 24, the controller 115 may write the cycle count $C_C$ and other relevant parameters to the non-volatile memory 2400 each time a change in the in the cycle count $C_C$ occurs. In another embodiment, illustrated in FIG. 25, the controller 115 may monitor its power supply and may store or update the data values in non-volatile memory 2400 when the monitored voltage 2500 indicates a power drop (e.g., at time $T_P$). The hardware of the controller can be designed to have sufficient capacitance to provide a buffer time (e.g., between time $T_P$ and time $T_B$) after the power drop during which the supplied voltage 2505 exceeds a minimum operating voltage $V_M$. During the buffer time, the controller 115 has sufficient power to write the data even after the power drop is initially detected.

The method may further provide logic to incorporate the historical data into a method of thermal management and protection. Once the controller 115 is operational, the stored data can be used to load the initial conditions relevant to the thermal protection method, which may depend on the type and value of the stored/retrieved data. In one embodiment, the data includes the stored cycle count, which is used to set the current cycle count based on logic and/or a tabulated scheme. In particular, according to TABLE 3, if the loaded value is greater than a fixed percentage of the maximum value in the worst case condition then the cycle limit is set to maximum cycle limit at the high temperature condition. Otherwise, the previous cycle count value is loaded. In an alternative method, the data is set to the maximum or most conservative values to prevent thermal damage to the motor.

TABLE 3

| Operation count before Reset | Operation count after Reset | WAIT TIME AFTER RESET | | |
|---|---|---|---|---|
| | | T < 35° C. | 35 <= T < 50° C. | 50° C. <= T |
| 0 | 0 | 0 | 0 | 0 |
| 1 | 1 | 0 | 0 | 0 |
| 2 | 2 | 0 | 0 | 0 |
| 3 | 3 | 0 | 0 | 0 |
| 4 | 4 | 0 | 0 | 0 |
| 5 | 10 | 0 | 0 | 120 s |
| 6 | 10 | 0 | 0 | 120 s |
| 7 | 10 | 0 | 0 | 120 s |
| 8 | 10 | 0 | 0 | 120 s |
| 9 | 10 | 0 | 0 | 120 s |
| 10 | 10 | 0 | 0 | 120 s |
| 11 | 11 | 0 | 0 | 240 s |
| 12 | 12 | 0 | 0 | 360 s |
| 13 | 13 | 0 | 0 | 480 s |
| 14 | 14 | 0 | 0 | 600 s |
| 15 | 15 | 0 | 80 s | 720 s |
| 16 | 16 | 0 | 160 s | 840 s |
| 17 | 17 | 0 | 240 s | 960 s |
| 18 | 18 | 0 | 320 s | 1080 s |
| 19 | 19 | 0 | 400 s | 1200 s |
| 20 | 20 | 60 s | 480 s | 1320 s |

Determination of Thermal Protection Characteristics

When thermal protection functions of an electric motor are controlled by software, it can be beneficial to verify that the thermal protection functions will adequately protect the system from overheating in a variety of scenarios. In general, software may be used to predict the thermal condition of the electric motor by using input and output values of the electric motor that are correlated to the amount of heat within the motor. However, without adequate measurement, the appropriate correlation factor is challenging to determine and the parameters that characterize motor thermal characteristics may not be sufficiently accurate over a range of operation.

Figure 26:
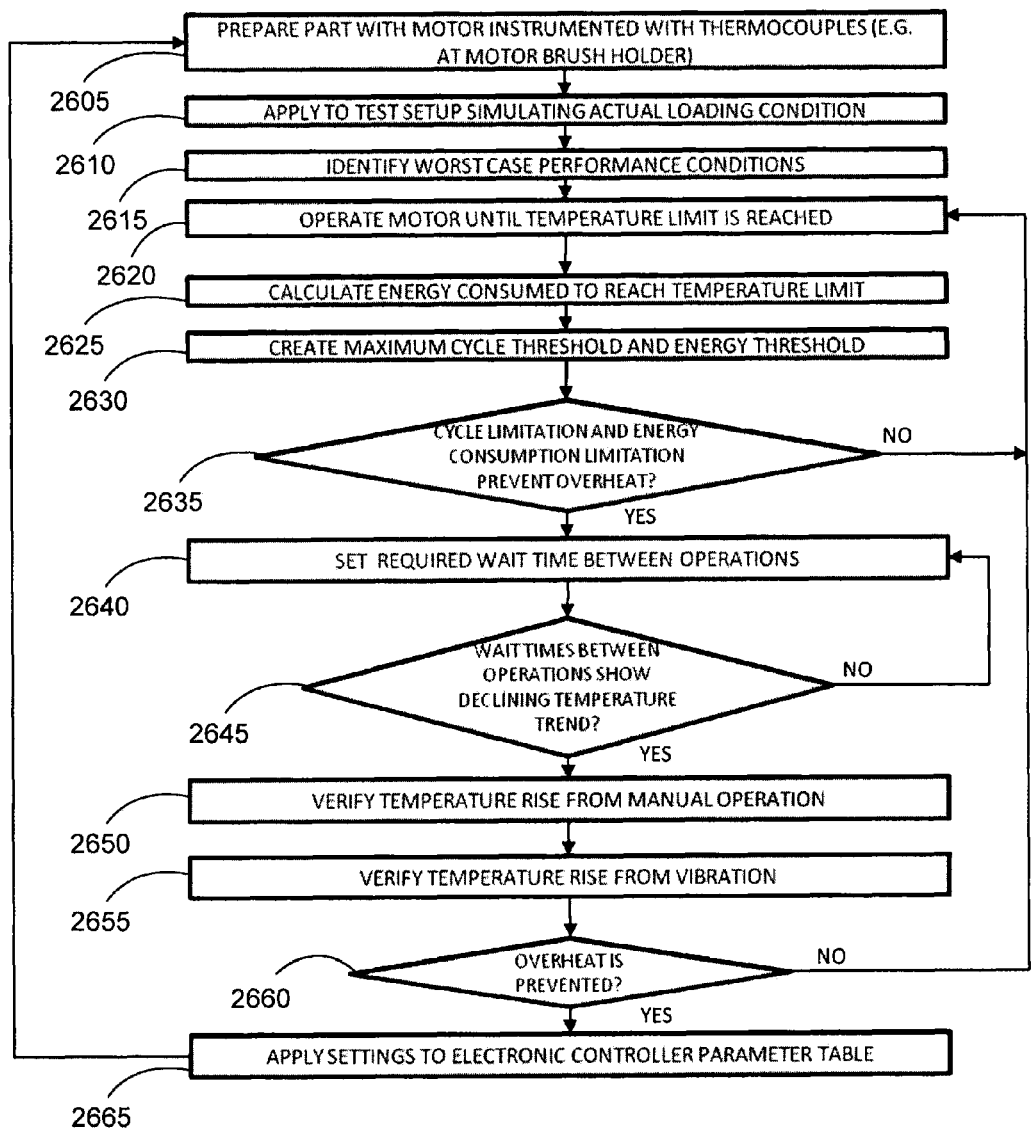
FIG. 26 is a flowchart of a method of verifying motor thermal characteristics.

In one approach, the internal temperature of the electric motor is measured and the control values are set based on the target system performance. Benefits of this approach include actual installed condition verification of the software, which allows for enhanced modeling and control of the overall system. A flowchart summarizing an example verification method is described in FIG. 26 and includes monitoring the temperature of the motor during worst-case operating conditions, calculating the energy consumed to reach an upper temperature limit, and then analyzing and verifying the results and settings. The verification method may characterize the motor 111 under powered operations, wherein heat is generated from the transfer of power from electrical to mechanical form, and under manual operation, wherein heat is generated from the transfer of power from mechanical to electrical form. The procedure can be repeated at various ambient temperatures to enhance the results obtained. The controller 115 or another computer or set of computers may record, analyze, compile, transmit, or otherwise process the data collected by any verification method described herein.

Figure 27:
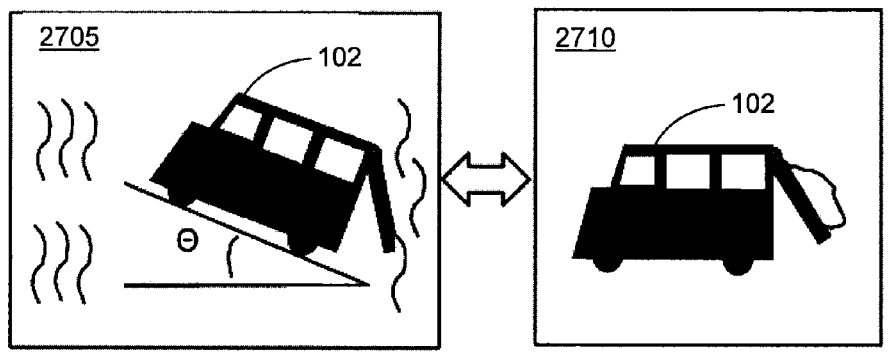
FIG. 27 is a plan view of two embodiments of testing worst case conditions of an electric motor operation for a power tailgate.

To characterize the powered operations of the motor 111, the motor 111 and the part it drives (e.g., PTG 102) may be fitted with thermocouples or other suitable temperature sensors at step 2605. At step 2610, one or more tests may then be performed by applying loading conditions to the PTG 102 while performing powered operations of the motor 111. During or after the tests, at step 2615 the worst case performance conditions may be identified. See FIG. 27 for example worst case testing conditions (thermal chamber testing at an angle θ incline condition 2705; heavy snow load condition 2710). Then, at step 2620, the motor 111 may be operated, such as by continuous cycling of powered operations, until its temperature limit is reached. For testing the worst case conditions, the motor 111 may be operated at maximum torque and/or maximum rated voltage. At step 2625, the energy consumed to reach the temperature limit may be calculated. At step 2630, based on the measured operations and calculated consumed energy, one or more cycle thresholds (e.g., cycle limit $C_L$) and/or one or more energy thresholds (e.g., energy limit $E_L$) may be set.

Figure 28A:
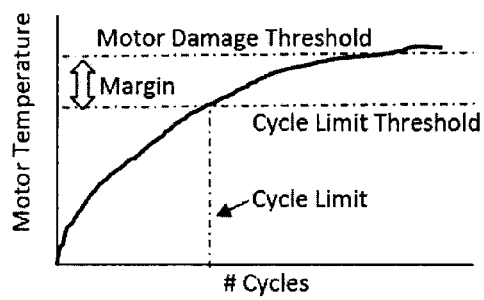
FIGS. 28A-B are charts depicting increasing and decreasing motor temperature, respectively, in light of determined thresholds in accordance with the method of FIG. 26.
Figure 28B:
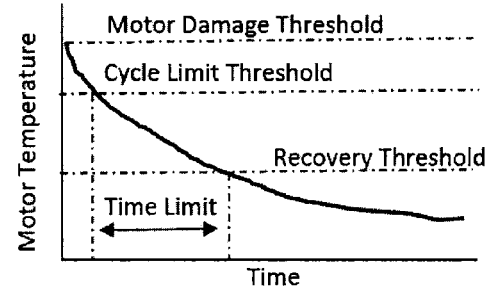
Figure 29:
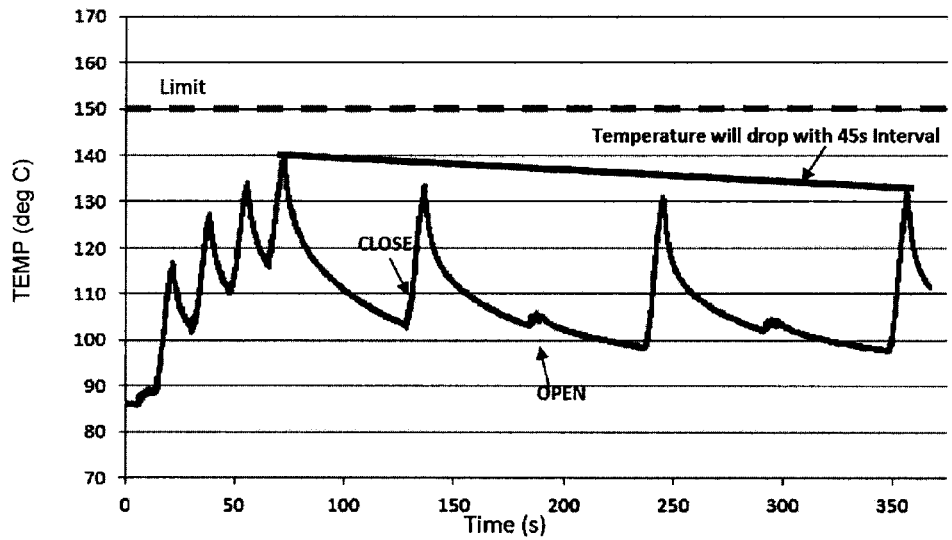
FIG. 29 is a chart depicting a cooling trend of an electric motor applying the methods of regulating heat of the present disclosure.

Once the threshold values are obtained, at step 2635 the obtained values may be tested by again operating the motor 111 to determine whether the thresholds prevent overheating of the motor 111. If not, the tests may be re-executed by returning to step 2620. If so, at step 2640 the wait times (e.g., increment time $T_i$ and decrement time $T_d$) may be obtained, such as by trial and error testing. FIGS. 28A and 28B are example graphs of the cycle limit and recovery time setting curves, respectively. Once the wait times are verified as indicating a cooling trend of the motor 111 (step 2645, see FIG. 29), the powered operations are characterized.

Figure 30:
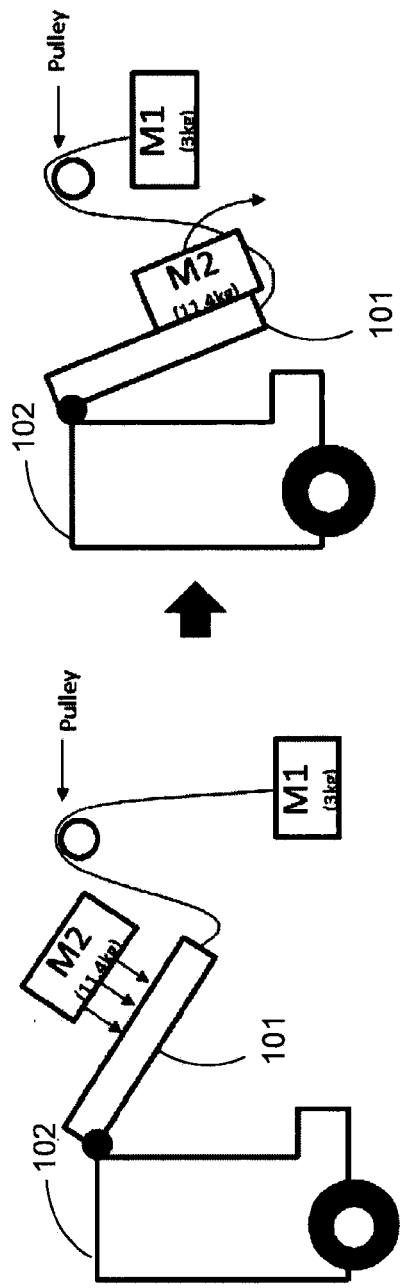
FIG. 30 is a plan view of an embodiment of verifying temperature increase of an electric motor during manual operations of the motor.

To characterize the manual operations of the motor 111, before or after characterizing the powered operations, the temperature rise of the motor 111 due to manual operations may be verified at step 2650. One method of testing the temperature rise is illustrated in FIG. 30, wherein a first weight M1 is attached to the PTG by a rope and pulley to pull open the PTG. At the fully open PTG position, a second weight M2 heavier than the first weight M1 is placed on the PTG to cause it to close under the load of the second weight M2. When the PTG approaches the fully closed position, the second weight M2 slides off the PTG and the first weight M1 pulls the PTG open again. The process is repeated to generate a consistent manual operation speed for thermal characterization.

Figure 31:
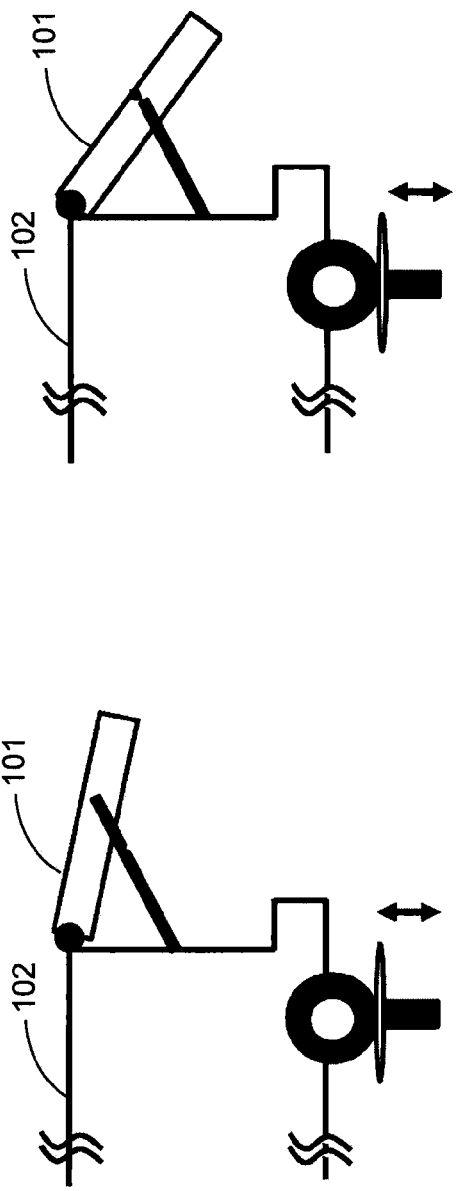
FIG. 31 is a plan view of another embodiment of verifying temperature increase of an electric motor during manual operations of the motor.

The contribution of vibration to the manual operation of the motor 111 may also be verified, at step 2655. FIG. 31 illustrates an embodiment of measuring the contribution of vibration at a fully open position and a partially open position of the PTG. The PTG may be secured in the partially open position with a bungee cord or rope. If the obtained settings are confirmed, at step 2660, to prevent overheat of the motor 111 in the manual operation conditions, at step 2665 the obtained settings are applied to the controller 115, such as by saving the obtained settings in a parameter table or other lookup table.

Given the benefit provided by this disclosure, one of ordinary skill in the art will appreciate the various modifications and alterations within the scope of the fundamental concepts. While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

I claim:

1. A method of managing power generation of an electric motor that is in electrical communication with a controller, the method comprising:
    monitoring a rotational speed of a drive shaft of the electric motor;
    comparing the rotational speed to an upper rotational speed threshold;
    limiting a voltage on a circuit path between the electric motor and the controller by electrically connecting a battery to the circuit path such that the voltage on the circuit path is limited to a battery voltage of the battery, the voltage being generated by the electric motor, when the rotational speed is greater than the upper rotational speed threshold;
    monitoring the voltage on the circuit path;
    comparing the voltage to an upper voltage threshold; and
    limiting the voltage when the voltage is greater than the upper voltage threshold.

2. The method of claim 1, wherein electrically connecting the battery to the circuit path comprises clamping the circuit path to the battery such that an excess voltage above the upper voltage threshold is transferred from the electric motor to the battery.

3. The method of claim 1, wherein monitoring the rotational speed comprises receiving the rotational speed from a hall sensor configured to detect the rotational speed of the drive shaft.

4. The method of claim 1, wherein monitoring the voltage on the circuit path comprises detecting the voltage across a plurality of power lines electrically connecting the controller to the electric motor.

5. The method of claim 1, wherein electrically connecting the battery to the circuit path comprises closing a relay between the circuit path and the battery.

6. The method of claim 1, further comprising:
    detecting that the electric motor has stopped generating an excess voltage; and
    if the battery is electrically connected to the circuit path, disconnecting the battery from the circuit path when the electric motor has stopped generating the excess voltage.

7. The method of claim 6, further comprising:
    detecting that the rotational speed is below a lower rotational speed threshold; and
    if the battery is electrically connected to the circuit path, disconnecting the battery from the circuit path when the electric motor has stopped generating the excess voltage and the rotational speed is below the lower rotational speed threshold.

8. The method of claim 1, further comprising:
    detecting that the rotational speed is below a lower rotational speed threshold; and
    if the battery is electrically connected to the circuit path, disconnecting the battery from the circuit path when the rotational speed is below the lower rotational speed threshold.

9. The method of claim 1, further comprising:
    determining whether the controller is in electrical communication with the battery; and
    if the controller is not in electrical communication with the battery, interrupting the electrical communication between the controller and the electric motor.

10. A method for preventing damage to a controller of an electric motor in a vehicle from back electromotive force, the vehicle having a battery and the method comprising:
    monitoring, in a circuit path, a voltage and a rotational speed generated by back-driving the motor;
    detecting whether power is supplied to the controller by the battery;
    if the controller is not powered by the battery, breaking the circuit path between the controller and the motor;
    if the controller is powered by the battery:
        comparing the voltage to an upper voltage threshold;
        comparing the rotational speed to an upper rotational speed threshold; and
        if the voltage exceeds the upper voltage threshold or the rotational speed exceeds the upper rotational speed threshold, clamping the circuit path to the battery to charge the battery with the voltage.

11. The method of claim 10, wherein breaking the circuit path between the controller and the motor comprises maintaining a harness relay of the vehicle in an open position, the harness relay controlling a power line between the controller and the motor.

12. The method of claim 10, wherein the upper voltage threshold is 18 volts.

13. The method of claim 10, further comprising:
    detecting that the motor has stopped generating an excess voltage; and
    if the circuit path is clamped to the battery, disconnecting the battery from the circuit path when the electric motor has stopped generating the excess voltage.

14. The method of claim 13, further comprising:
    detecting that the rotational speed is below a lower rotational speed threshold; and
    if the circuit path is clamped to the battery, disconnecting the battery from the circuit path when the motor has stopped generating the excess voltage and the rotational speed is below the lower rotational speed threshold.

15. The method of claim 10, further comprising:
    detecting that the rotational speed is below a lower rotational speed threshold; and
    if the circuit path is clamped to the battery, disconnecting the battery from the circuit path when the rotational speed is below the lower rotational speed threshold.

16. A system for controlling an electric motor in a vehicle, the vehicle having a circuit path between a battery of the vehicle and the electric motor, the system comprising:
    at least one controller in electrical communication with the circuit path;
    a harness relay disposed in electrical communication with the circuit path and configured to break or complete the circuit path between the electric motor and the controller; and
    a main relay disposed in electrical communication with the circuit path and configured to break or complete the circuit path between the electric motor and the battery;

the controller being configured to:
- close the harness relay to complete the circuit path between the electric motor and the controller when the electric motor is being back-driven;
- detect when a voltage generated by back-driving the motor exceeds an upper voltage threshold;
- detect when a rotational speed generated by back-driving the motor exceeds an upper rotational speed threshold;
- upon detection of the voltage exceeding the upper voltage threshold or the rotational speed exceeding the rotational speed threshold, cause the main relay to close, completing the circuit path from the electric motor to the battery to charge the battery with the voltage;
- detect whether the controller is powered by the battery; and
- if the controller is not powered by the battery, maintain the harness relay in an open position to break the circuit path between the electric motor and the controller.

17. The system of claim 16, wherein the controller is further configured to:
- detect that the voltage is no longer above the upper voltage threshold;
- detect that the rotational speed is below a lower rotational speed threshold; and
- open the main relay when the voltage is below the upper voltage threshold and the rotational speed is below a lower rotational speed threshold.

\* \* \* \* \*